United States Patent [19]
Phillips

[11] Patent Number: 5,801,979
[45] Date of Patent: Sep. 1, 1998

[54] CARRY LOGIC THAT PRODUCES A CARRY VALUE FROM NLSBS FOR A ROM ACCUMULATOR IN AN INVERSE DISCRETE COSINE TRANSFORM PROCESSOR

[75] Inventor: Larry Phillips, Collingswood, N.J.

[73] Assignee: Matsushita Electric Corporation of America, Secaucus, N.J.

[21] Appl. No.: 546,469

[22] Filed: Oct. 20, 1995

[51] Int. Cl.$^6$ .............................. G06F 7/50; G06F 17/14
[52] U.S. Cl. ................................ 364/768; 364/725.03
[58] Field of Search .................... 364/725, 758, 364/750.5, 754, 757, 760, 768, 784, 786, 787, 788

[56] References Cited

U.S. PATENT DOCUMENTS

| | | | |
|---|---|---|---|
| 4,760,543 | 7/1988 | Ligtenberg et al. | 364/725.01 |
| 4,791,598 | 12/1988 | Liou et al. | 364/725 |
| 5,126,962 | 6/1992 | Chiang | 382/250 |
| 5,197,021 | 3/1993 | Cucchi et al. | 364/725 |
| 5,299,029 | 3/1994 | Shirasawa | 364/725 |
| 5,357,453 | 10/1994 | Kim et al. | 364/725.03 |
| 5,361,220 | 11/1994 | Asano | 364/725 |
| 5,387,982 | 2/1995 | Kitaura et al. | 382/250 |

(List continued on next page.)

OTHER PUBLICATIONS

Stanley, A. White, "Applications of Distributed Arithmetic to Digital Signal Processing: A Tutorial Review", IEEE ASSP Magazine, pp. 4–19, Jul. 1989.

Kwok K. Chau, I-Fay Wang, and Creighton L. Eldridge, "VLSI Implementation Of A 2-D DCT In A Compiler", VLSI Design Laboratory, Texas Instruments, V4.6, pp. 1233–1236, IEEE 1991.

IEEE Circuits and Systems Standards Committee, "IEEE Standard Specifications for the Implementations of 8×8 Inverse Discrete Cosine Transform", IEEE Std. 1180–1990, pp. 1–13, Mar. 18, 1991.

M. Maruyama, H. Uwabu, I. Iwasaki, H. Fujiwara, T. Sakaguchi, M.T. Sun, and M.L. Liou, "VLSI Architecture and Implementation of a Multi-Function, Forward/Inverse Discrete Cosine Transform Processor", SPIE vol. 1360 Visual Communications and Image Processing '90, pp. 410–417.

ISO/IEC 13818–22: 1995 E, "Information Technology—Generic Coding of Moving Pictures and Associated Audio Information: Video", Recommendation ITU-T H.262, pp. 1–231.

*Primary Examiner*—Chuong Dinh Ngo
*Attorney, Agent, or Firm*—Ratner & Prestia

[57] ABSTRACT

An inverse discrete cosine transform processor for transforming a video signal from frequency domain signals into spatial domain signals. A bus converter receives DCT coefficient data from parallel processing paths and converts the DCT coefficient data to even and odd processing paths. Partial IDCT processors convert, in parallel, the coefficient data from the even and odd processing paths to produce intermediate coefficient values by performing a one dimensional transform. The intermediate coefficient values are transposed in a transpose RAM to produce transposed intermediate coefficient values which are subsequently separated into even and odd processing paths and converted in parallel to produce pixel values by performing a one dimensional transform. The 1-D IDCT processors each include input section circuits which each receive four-bits of 12-bit or 16-bit input values and provides one bit of each of four input values in a four clock cycle time period. Each of the 1-D IDCT processors also includes an accumulator section which includes adders which sum M-1 bit values to produce an M-bit output value. Any bits of less significance than the M-1 input values are applied to carry logic circuitry which generates a carry signal without generating a sum signal for these less significant bits. The carry is combined with output value produced by each accumulator section.

15 Claims, 21 Drawing Sheets

U.S. PATENT DOCUMENTS

| | | | |
|---|---|---|---|
| 5,434,808 | 7/1995 | Cohen | 364/725 |
| 5,473,559 | 12/1995 | Makino | 364/758 |
| 5,481,487 | 1/1996 | Jang et al. | 364/758 |
| 5,583,803 | 12/1996 | Matsumota et al. | 364/725 |
| 5,590,067 | 12/1996 | Jones et al. | 364/725 |
| 5,596,518 | 1/1997 | Toyokura et al. | 364/725.03 |
| 5,598,361 | 1/1997 | Nagamatsu et al. | 364/725 |
| 5,610,849 | 3/1997 | Huang | 364/725 |

BIT DATA FORMAT-3baat      EVEN SECTION

INPUT SECTION 0  | BIT 0 FROM X0,2,4,6 | BIT 3 FROM X0,2,4,6 | BIT 6 FROM X0,2,4,6 | BIT 9 FROM X0,2,4,6 |

INPUT SECTION 1  | BIT 1 FROM X0,2,4,6 | BIT 4 FROM X0,2,4,6 | BIT 7 FROM X0,2,4,6 | BIT 10 FROM X0,2,4,6 |

INPUT SECTION 2  | BIT 2 FROM X0,2,4,6 | BIT 5 FROM X0,2,4,6 | BIT 8 FROM X0,2,4,6 | BIT 11 FROM X0,2,4,6 |

ODD SECTION

INPUT SECTION 0  | BIT 0 FROM X1,3,5,7 | BIT 3 FROM X1,3,5,7 | BIT 6 FROM X1,3,5,7 | BIT 9 FROM X1,3,5,7 |

INPUT SECTION 1  | BIT 1 FROM X1,3,5,7 | BIT 4 FROM X1,3,5,7 | BIT 7 FROM X1,3,5,7 | BIT 10 FROM X1,3,5,7 |

INPUT SECTION 2  | BIT 2 FROM X1,3,5,7 | BIT 5 FROM X1,3,5,7 | BIT 8 FROM X1,3,5,7 | BIT 11 FROM X1,3,5,7 |

BIT DATA FORMAT-4baat       EVEN SECTION

INPUT SECTION 0

INPUT SECTION 1

INPUT SECTION 2

INPUT SECTION 3

ODD SECTION

INPUT SECTION 0

INPUT SECTION 1

INPUT SECTION 2

INPUT SECTION 3

FIG. 10

| A0 | A4 | A8  | A12 | A16 | A20 | A24 | A28 |
|----|----|-----|-----|-----|-----|-----|-----|
| A1 | A5 | A9  | A13 | A17 | A21 | A25 | A29 |
| A2 | A6 | A10 | A14 | A18 | A22 | A26 | A30 |
| A3 | A7 | A11 | A15 | A19 | A23 | A27 | A31 |

FIG. 11a

| X1 | X17 | X33 | X49 | X8  | X24 | X40 | X56 |
|----|-----|-----|-----|-----|-----|-----|-----|
| X3 | X19 | X35 | X51 | X10 | X26 | X42 | X58 |
| X5 | X21 | X37 | X53 | X12 | X28 | X44 | X60 |
| X7 | X23 | X39 | X55 | X14 | X30 | X46 | X62 |

| X0 | X16 | X32 | X48 | X9  | X25 | X41 | X57 |
|----|-----|-----|-----|-----|-----|-----|-----|
| X2 | X18 | X34 | X50 | X11 | X27 | X43 | X59 |
| X4 | X20 | X36 | X52 | X13 | X29 | X45 | X61 |
| X6 | X22 | X38 | X54 | X15 | X31 | X47 | X63 |

CARRY LOGIC THAT PRODUCES A CARRY VALUE FROM NLSBS FOR A ROM ACCUMULATOR IN AN INVERSE DISCRETE COSINE TRANSFORM PROCESSOR

FIELD OF THE INVENTION

This invention relates to a processor for converting frequency domain signals, e.g., MPEG-2 encoded video signals, into spatial domain signals by performing an inverse discrete cosine transform operation.

BACKGROUND OF THE INVENTION

In the United States a standard has been proposed for digitally encoded high definition television signals. A portion of this standard is essentially the same as the MPEG-2 standard, proposed by the Moving Picture Experts Group (MPEG) of the International Organization for Standardization (ISO). The standard is described in a International Standard (IS) publication entitled, "Information Technology—Generic Coding of Moving Pictures and Associated Audio, Recommendation H.626", ISO/IEC 13818-2, IS, 11/94 which is available from the ISO and which is hereby incorporated by reference for its teaching on the MPEG-2 digital video coding standard.

The MPEG-2 standard its actually several different standards. In MPEG-2 several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level is intended for coding high-definition television images. Images encoded according to the Main Profile, High Level standard may have as many as 1,152 active lines per image frame and 1,920 pixels per line.

The Main Profile, Main Level standard, on the other hand, defines a maximum picture size of 720 pixels per line and 567 lines per frame. At a frame rate of 30 frames per second, signals encoded according to this standard have a data rate of 720*567*30 or 12,247,200 pixels per second. By contrast, images encoded according to the Main Profile, High Level standard have a maximum data rate of 1,152*1, 920*30 or 66,355,200 pixels per second. This data rate is more than five times the data rate of image data encoded according to the Main Profile Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

The MPEG-2 standard defines a complex syntax which contains a mixture of data and control information. Some of this control information is used to enable the signals having several different formats to be covered by the standard. These formats define images, having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in six layers, the sequence layer, the group of pictures layer, the picture layer, the slice layer, the macroblock layer, and the block layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

To effectively receive the digital images, a decoder must process the video signal information rapidly. To be optimally effective, the coding systems should be relatively inexpensive and yet have sufficient power to decode these digital signals in real time.

Using existing techniques, a decoder may be implemented using a single processor having a complex design and operating at a high data rate to perform this function. This high data rate, however, would require very expensive circuitry, which would be contrary to the implementation of a decoder in a consumer television receiver in which cost is a major factor.

Another alternative is to use a decoder employing parallel processing. Using parallel processing reduces the cost of the circuitry while maintaining the high data rates. FIG. 13 shows one such system. The decoder in FIG. 13 includes two parallel processing paths A and B. First, the input bit-stream is applied to router circuitry 5. Router circuitry 5 directs the bit-stream into different logically defined processing paths A and B, each path processing macroblocks from a respectively different slice of an MPEG-2 encoded image. Variable Length Decoders (VLD) 10a and 10b decode the separated data streams to generate blocks of quantized discrete cosine transform (DCT) coefficient values. These blocks of values are applied to respective inverse zig-zag scan memories 15a and 15b to perform the inverse scan. The inverse quantizers 20a and 20b perform an inverse quantization of the quantized DCT values provided by inverse zig-zag scan memories 15a and 15b. The DCT coefficient values are provided to inverse discrete cosine transform (IDCT) circuits 25a and 25b. The output data of IDCT circuits 25a and 25b are blocks of pixel values or differential pixel values.

Each of the IDCT circuits 25a and 25b performs a 2-dimensional IDCT operation on the DCT coefficient values. An Inverse Discrete Cosine Transformation (IDCT) is performed, as discussed above, to reconstruct the original picture elements or pixels. An 8-point 1-D IDCT is shown equation (1):

$$\begin{bmatrix} (x_0+x_7)/2 \\ (x_1+x_6)/2 \\ (x_2+x_5)/2 \\ (x_3+x_4)/2 \\ (x_0-x_7)/2 \\ (x_1-x_6)/2 \\ (x_2-x_5)/2 \\ (x_3-x_4)/2 \end{bmatrix} = \begin{bmatrix} d & b & d & f & 0 & 0 & 0 & 0 \\ d & f & -d & -b & 0 & 0 & 0 & 0 \\ d & -f & -d & b & 0 & 0 & 0 & 0 \\ d & -b & d & -f & 0 & 0 & 0 & 0 \\ 0 & 0 & 0 & 0 & a & c & e & g \\ 0 & 0 & 0 & 0 & c & -g & -a & -e \\ 0 & 0 & 0 & 0 & e & -a & g & c \\ 0 & 0 & 0 & 0 & g & -e & c & -a \end{bmatrix} \begin{bmatrix} X_0 \\ X_2 \\ X_4 \\ X_6 \\ X_1 \\ X_3 \\ X_5 \\ X_7 \end{bmatrix} \quad (1)$$

where xn (n=0, 1, 2, . . . , 7) is the result of the matrix multiplication, Xn is a input coefficient value, and a, b, c, d, e, f, g are constants in the IDCT matrix. Intermediate coefficient values are produced using equations (2):

$$(x_0+x_7)/2 + (x_0-x_7)/2 = x_0 \quad (2)$$

$$(x_1+x_6)/2 + (x_1-x_6)/2 = x_1$$

-continued $$(x_2 + x_5)/2 + (x_2 - x_5)/2 = x_2$$

$$(x_3 + x_4)/2 + (x_3 - x_4)/2 = x_3$$

$$(x_0 + x_7)/2 - (x_0 - x_7)/2 = x_7$$

$$(x_1 + x_6)/2 - (x_1 - x_6)/2 = x_6$$

$$(x_2 + x_5)/2 - (x_2 - x_5)/2 = x_5$$

$$(x_3 + x_4)/2 - (x_3 - x_4)/2 = x_4$$

Each IDCT circuit implements the 1-D IDCT of equations (1) and (2) twice. The values Xn provided to the first 1-D are DCT coefficient values and the output value produced xn is an intermediate coefficient value. The input value Xn to the second 1-D IDCT are the transposed intermediate coefficient values xn from the first 1-D IDCT. The output values xn of the second 1-D IDCT are pixel values. Equation (1) includes matrix multiplication to calculate an inner product.

One method of calculating the inner product is distributed arithmetic. Distributed arithmetic is a bit-serial computational operation that forms an inner product of a pair of vectors. Distributed arithmetic has been used in the past to perform DCTs and IDCTs as shown in Maruyama, *VLSI Architecture and Implementation of a Multi-Function Forward/Inverse Discrete Cosine Transform Processor*, Visual Communications and Image Processing '90, Vol. 1360, pp. 410–417, and TWO-DIMENSIONAL DISCRETE COSINE TRANSFORM PROCESSOR, U.S. Pat. No. 4,791,598, (hereinafter the '598 patent) issued to Liou et al., each incorporated herein by references for their teachings on distributed arithmetic to perform DCTs and IDCTs.

Distributed arithmetic is a bit-serial method where individual bits of the input values are used to address a Look-up Table (LUT) stored in, for example, a Read Only Memory (ROM). In general, this can be extended to a digit-serial method using Z bits per input value. The number Z is often referred to as the number of bits-at-a-time (baat). The LUT must be large enough to accommodate an input vector of length N with Z bits per input. One LUT could be used hiving an address of N*Z bits, however, this leads to a large LUT. The preferred embodiment of the present invention described herein uses Z LUT's each having an address of N−1 bits. The address reduction from N to N−1 exploits the fact that the absolute value of data is mirrored from the top half to the bottom half of a LUT having N address bits when offset binary is used to generate the LUT. The precomputed values in the LUT are inner products of the constant IDCT matrix in equation (1) and a single bit from each of N input values. These pre-computed values are then summed in a digit-serial manner to produce the complete inner product values.

In the decoder of FIG. 13, the IDCT circuits 25a and 25b can be implemented using IDCT processors that employ distributed arithmetic techniques. The disadvantage to the approach is that the pipeline is not kept full in the first 1-D IDCT section of both 25a and 25b. Eight 12-bit parallel input words are required to perform the inner product in FIG. 13. In distributed arithmetic, the word width in bits is divided by the number of input words to get the ideal number of bits-at-a-time (baat). In this case twelve divided by eight is 1.5. This number must be rounded up to 2 for actual implementation. The clock period required for the distributed arithmetic is calculated by dividing the word width in bits by the number of baat. The result of 12 divided by 2 is 6 clock periods. The eight input words require eight clock periods. Therefore, the pipeline is idle for 2 clock periods. In other words, resources in the first 1-D IDCT section of both 25a and 25b are not used for 2 out of 8 clocks. Although the processing speed of the decoder is maintained using the dual processing paths, the cost of the decoder is increased using the duplicate IDCT circuits.

The '598 patent illustrates an alternative method in a two-dimensional DCT processor which transforms pixels to DCT coefficients using distributed arithmetic. The '598 uses distributed arithmetic to simultaneously compute the inner product of an entire row or column of a matrix. The DCT processor includes a N×1 column DCT processor which includes N circuits that compute the elements of the column transformation concurrently. The elements of the column transformation are stored in a transposition memory. Then, after being transposed, a N×1 row processor transforms the output of the transposition memory. The '598 patent is not provided with pixel data from parallel paths and, thus, does not produce DCT coefficients from parallel processing paths. The '598 patent separates the pixels from a single processing path to transform that data in parallel. Consequently, the pixel data is processed at the rate it is received.

SUMMARY OF THE INVENTION

There are two distinct parts to the mathematical operations performed by each 1-D IDCT. The first part is the calculation of the inner product as shown in equation (1). Distributed arithmetic is used to sum precomputed values over N clock periods. All of the distributed arithmetic is performed within a partial 1-D IDCT section, whereas the second of the mathematical calculations shown in equation (2) requires crossover additions and subtractions between even and odd partial 1-D IDCT sections. The final distributed arithmetic summation contains M+(N*Z) bits where M is the ROM word width, N is the number of input vectors and Z is the number baat. This bit width is further increased by one during the crossover additions and subtractions. Efficient hardware implementation requires bit width reduction by rounding or truncation to approximately M bits in the intermediate case and to K bits for the final pixel value, where K is less than M.

Distributed arithmetic is a bit serial (if BAAT >1, it is also digit-serial) summation and accumulation of precomputed values. The summation begins with the Z precomputed values pointed to by the least significant digit-serial input word and continues on each successive clock period with the Z precomputed values pointed to by the next more significant digit-serial input word until, on the Nth clock period, the summation is completed with the addition of the Z precomputed values pointed to by the most significant digit-serial input word. Intermediate sums are right-shifted by Z bits before being added to the next Z precomputed values due to the digit-serial nature of distributed arithmetic. These Z bits that are generated on each of the N clock periods are not altered by the continuing distributed arithmetic processing. These Z bits that are generated on each of the N clock periods are not altered by the continuing distributed arithmetic processing.

The present invention concerns carry logic circuitry that eliminates hardware resources that would be required to store the N*Z bits in each accumulator (there are 16 accumulators in an 8×8 2-D IDCT) and reduces the size of the latches and adders required for crossover addition and subtract-on. The carry logic circuitry implements the crossover addition and subtraction for the Z least significant bits with only carrys generated and the most significant carry saved. Each succeeding group of Z bits is more significant than the preceding group until the final most significant group is reached on the Nth clock. Therefore, the most significant carry that is saved for each group of Z bits becomes the carry-in for the next group of Z bits. The final most significant carry that is generated on the Nth clock is saved in a latch along with the final distributed arithmetic sum. This saved carry is the carry-in during the crossover addition and subtraction of the accumulated sums.

BRIEF DESCRIPTION OF THE DRAWINGS

FIG. 2a is a timing diagram illustrating the operation of the bus converter shown in FIG. 1a.

FIG. 2b is a chart illustrating the format of the MPEG scan pattern 0 and the MPEG scan pattern 1.

FIG. 2e is a timing diagram illustrating the input data format for the even and odd input sections of the IDCT apparatus contained in 105a and 105b shown in FIG. 1c and shown in FIG. 1d.

FIG. 3b is a block diagram of the M2 blocks shown in FIG. 3a.

FIGS. 4a–4i are data structure diagrams illustrating the operation of the input section shown in FIG. 3a.

FIG. 10 is a memory map diagram which illustrates a possible memory address assignment for the RAMs 900a and 900b shown in FIG. 9.

FIGS. 11a–11g are memory map diagrams which show how data is stored in and retrieved from the RAMs 900a and 900b shown in FIG. 9.

DETAILED DESCRIPTION

Figure 1A:
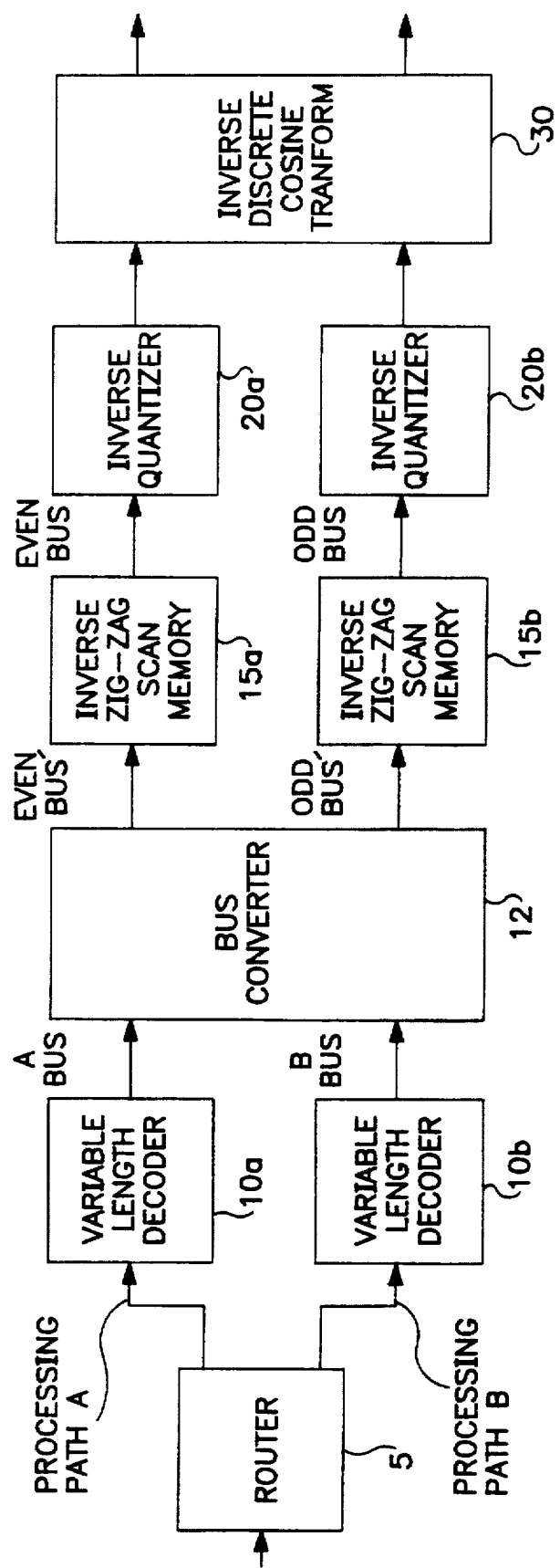
FIG. 1a is a block diagram of a decoder apparatus in accordance with an exemplary embodiment of the present invention.

The IDCT processor according to the exemplary embodiment of the present invention performs an IDCT to transform DCT coefficients in the data streams of parallel processing paths while eliminating the need for a separate IDCT circuit for each processing path. The data rate of the decoder is not reduced even though a separate IDCT circuit is not provided for each processing path. In addition, the circuitry to implement the IDCT is reduced relative to that which would be used in separate IDCT circuits for each path. Thus, the cost of the decoder is also reduced.

OVERVIEW

The exemplary embodiment of the present invention relates to an MPEG decoder for decoding a bit stream containing DCT coefficients which includes parallel processors for processing the bit stream in two parallel processing paths to acquire the DCT coefficients from the bit stream. The parallel processors operate at a first data rate. The DCT coefficients are provided to a single IDCT processor. The IDCT processor transforms the DCT coefficient at a second data rate, which is twice the first data rate, to produce pixel values.

In another alternative embodiment of the invention the IDCT processor transforms a video signal containing coefficient values from frequency domain signals into spatial domain signals. Bus convertor 12 in FIG. 1a working in conjunction with Inverse Zig-Zag Scan Memories 15a and 15b rearranges the data blocks received from parallel processing paths each containing both even and odd data into parallel processing paths in which one path is restricted to even data and the other path is restricted to odd data. This is advantageous because equation (1) can be separated into two smaller equations in which four of the eight output terms are only dependent on even inputs and the remaining four output terms are only dependent on odd inputs as shown in equations (3a) and (3b) below.

$$\begin{bmatrix} (x_0+x_7)/2 \\ (x_1+x_6)/2 \\ (x_2+x_5)/2 \\ (x_3+x_4)/2 \end{bmatrix} = \begin{bmatrix} d & b & d & f \\ d & f & -d & -b \\ d & -f & -d & b \\ d & -b & d & -f \end{bmatrix} \begin{bmatrix} X_0 \\ X_2 \\ X_4 \\ X_4 \end{bmatrix} \quad (3a)$$

$$\begin{bmatrix} (x_0-x_7)/2 \\ (x_1-x_6)/2 \\ (x_2-x_5)/2 \\ (x_3-x_4)/2 \end{bmatrix} = \begin{bmatrix} a & c & e & g \\ c & -g & -a & -e \\ e & -a & g & c \\ g & -e & c & -a \end{bmatrix} \begin{bmatrix} X_1 \\ X_3 \\ X_5 \\ X_7 \end{bmatrix} \quad (3b)$$

The advantage to this approach is that two partial 1-D IDCT processors can be used, one for the even inputs and one for the odd inputs. In this approach only four 12-bit parallel input words are required to perform the inner products represented by equations (3a) an (3b). The following distributed arithmetic equations show that 3 baat is optimum and leads to a fully loaded pipeline with no wasted resources.

baat = ((bit width)/number of input words = 12/4 = 3 clock periods for distributed arithmetic = (bit width)/baat = 12/3 = 4 clock periods for input words = 4

Exactly 4 clock periods are required for both inputting the four input values and for performing the distributed arithmetic. Partial IDCT processors convert, in parallel, the coefficient data representing even and odd coefficient values in the block to produce intermediate coefficient values by performing a first one-dimensional transform. The intermediate coefficient values are transposed in a transpose RAM to produce transposed intermediate coefficient values. The transposed intermediate coefficient values are separated into even and odd processing paths and are processed in parallel to produce pixel values by performing a second one dimensional transform.

Figures 2A, 2B:
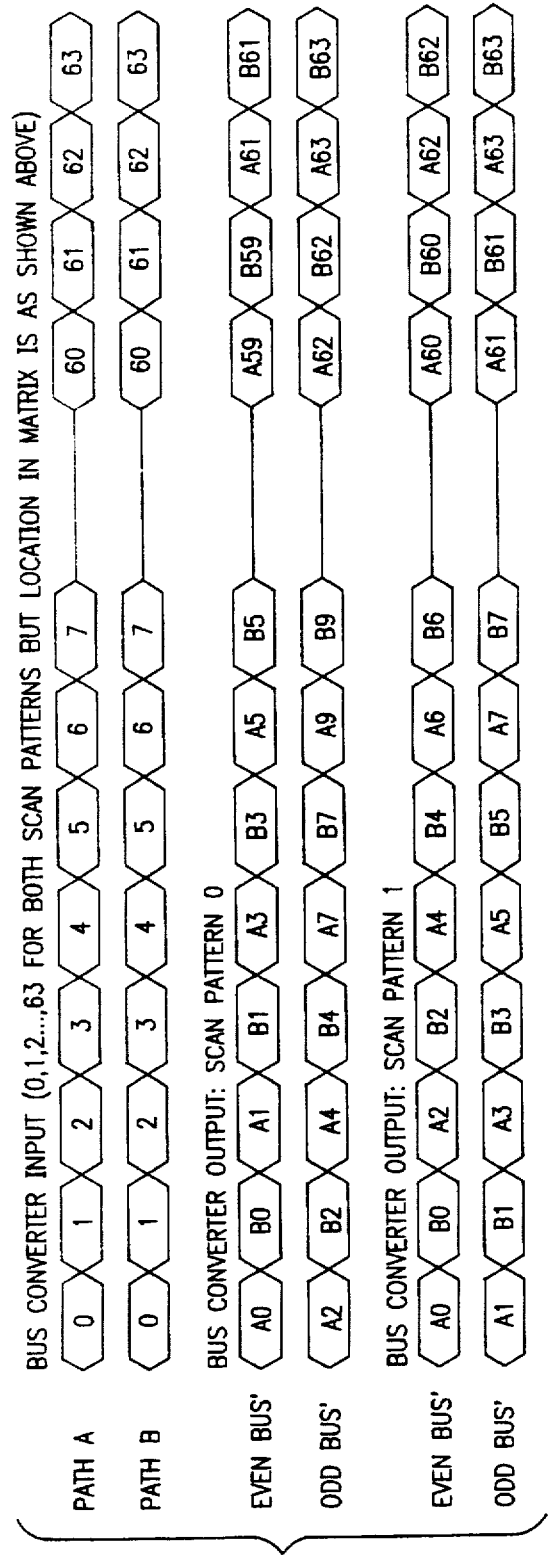

FIG. 1a illustrates the overall organization of the decoder including the inverse discrete cosine transform (IDCT) circuitry according to an exemplary embodiment of the present invention. First, the input bit-stream is applied to router circuitry 5. Router circuitry 5 separates the bit-stream into different logically defined processing paths A and B. For example, each path may process data from respectively different slices of an MPEG-2 encoded image. Variable length decoders (VLDs) 10a and 10b decode the separated data streams to generate blocks of quantized discrete cosine transform coefficient values. These blocks are applied to a bus converter which converts the blocks of coefficient values from respective processing paths A and B to quantized coefficient values arranged as shown in FIG. 2a. The coefficients are provided one value at a time in formats specified by the above referenced MPEG-2 specification. Two different arrangements are shown because the MPEG standard uses two different zig-zag scan patterns 0 and 1 shown in FIG. 2b. The type of scan pattern is detected and the bus converter produces the appropriate output as shown in FIG. 2a.

Figure 2C:
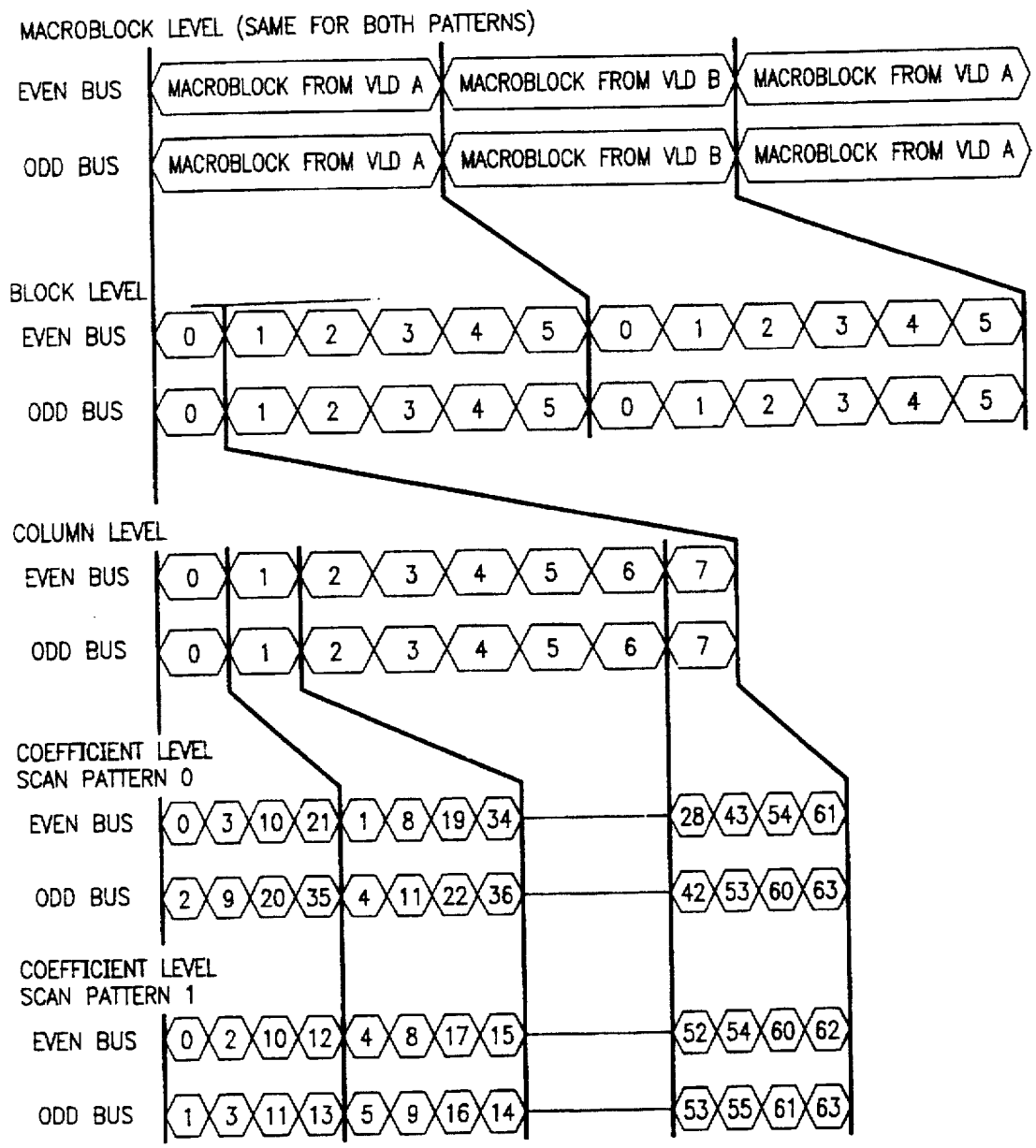
FIG. 2c is a timing diagram illustrating the input data of the IDCT apparatus shown in FIG. 1b. The coefficient numbers refer to MPEG scan pattern numbers in FIG. 2b.

Respective inverse zig-zag scan memories 15a and 15b perform an inverse zig-zag scan of the even and odd coefficients of each block of coefficients provided by the bus converter 12 as shown in FIG. 2c. The macroblock level timing diagram shows that a complete macroblock from the VLD in processing path A is output on the even and odd buses. The even components are on the even bus and the odd components are on the odd bus. This is followed by a macroblock from the VLD in processing path B. This alternation between the two processing paths A and B continues. FIGS. 2c and 2g illustrate the block structure of the macroblocks. FIG. 2c also shows that the blocks are output in column order rather than in row order. The coefficient level format illustrates the data present in the columns from the different scan patterns. The inverse quantizers 20a and 20b dequantize the quantized DCT coefficient values. The DCT coefficient values from inverse quantizers 20a and 20b are provided to IDCT circuitry 30 to produce pixel values.

It is noted that the even bus coefficients include odd numbered values and the odd bus coefficients include even numbered values. This occurs because the values are divided according to even and odd row numbers of the columns of the blocks of zig-zag scanned coefficient values, as shown in FIG. 2b. The numbers appearing in FIG. 2b show the order in which individual data elements of a block were encoded and decoded. As an example for MPEG Scan Pattern 0, the first data element to be encoded/decoded is the one in Row 0, Column 0 which contains the number 0. Successive data elements are numbered 1, 2, 3, . . . , 63. So the next data element after 0 is in Row 0, Column 1, followed by Row 1, Column 0, etc. The inverse Zig-Zag scan memory reorders the block data such that columns of data are read with the even data placed on the even bus and the odd data placed on the odd bus. The coefficient level number shown in timing diagram FIG. 2c can be changed and shown as the timing diagram of FIG. 2f. This diagram shows that 64 values are read from a block and that eight values are read in each column, four even and four odd.

Figure 1B:
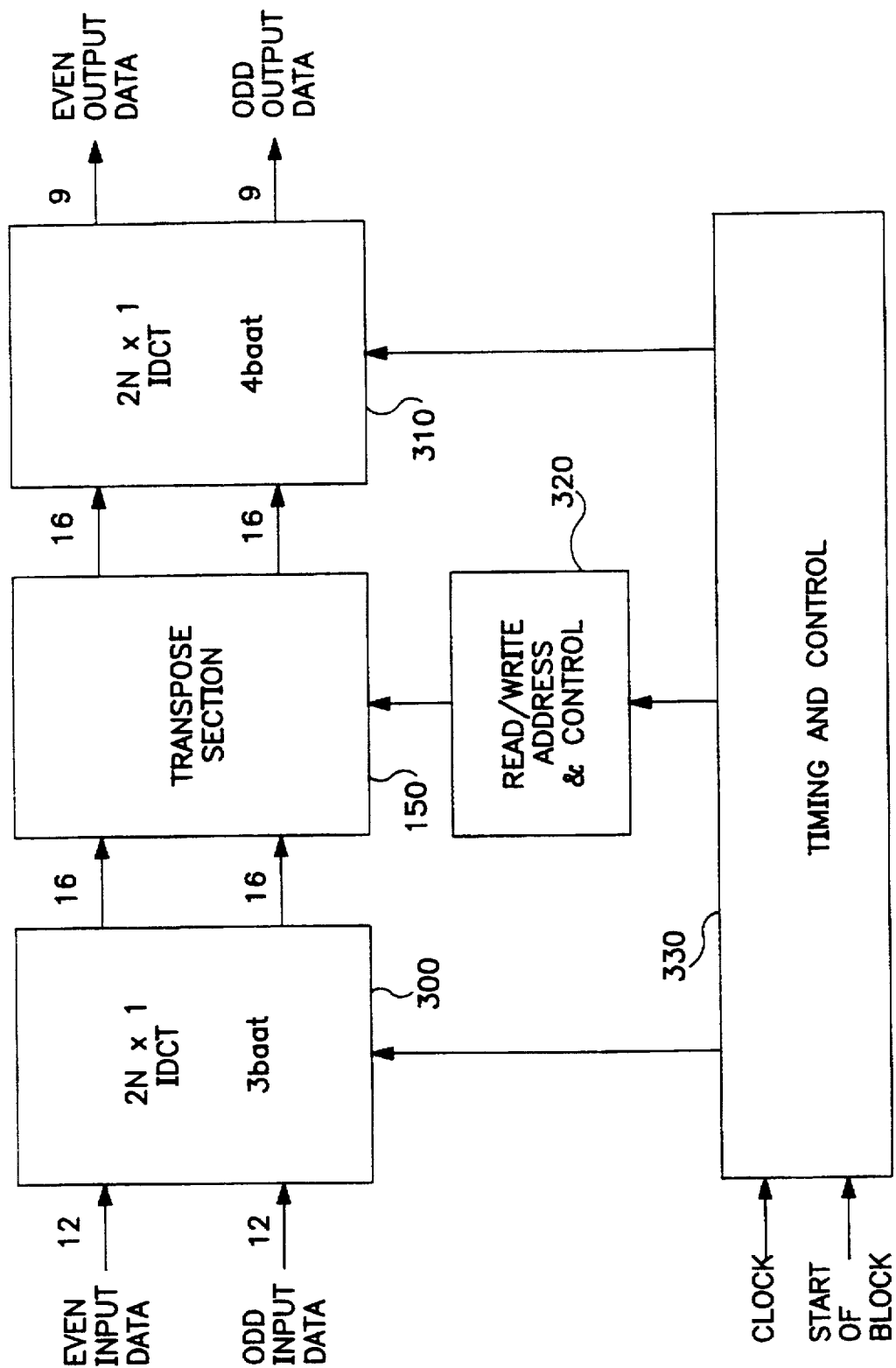
FIG. 1b is a block diagram of an IDCT apparatus in an MPEG decoder in accordance with an exemplary embodiment of the present invention.

The overall organization of the IDCT circuitry 30 is shown in FIG. 1b. The IDCT circuitry performs a 2-D IDCT process by first performing a one dimensional IDCT transformation in IDCT circuit 300, transposing the resulting data in transpose section 150, and performing a second one dimensional IDCT transformation in IDCT circuitry 310.

The even and odd input coefficient data streams are provided to 2N×1 IDCT circuitry 300 implemented using three-bit-at-a-time (3baat) distributed arithmetic in column order followed by crossover additions and subtractions to produce groups of intermediate DCT coefficient values. 2N×1 IDCT circuitry 300 performs the first IDCT transformation. The intermediate coefficients are transposed column-to-row in transpose section 150. In response to read/write address and control circuitry 320, transpose section 150 separates the intermediate coefficients again into even and odd processing paths. The transposed intermediate coefficients, now in row order, are transformed by 2N×1 IDCT circuitry 310 to produce the pixel values. 2N×1 IDCT circuitry 310 is implemented using four-bit-at-a-time (4baat) distributed arithmetic.

Timing and control circuitry 330 provides timing signals to control the 2N×1 IDCT circuitry 300, the 2N×1 IDCT circuitry 310, the transpose section 150, and the read/write address and control 320.

Figure 13:
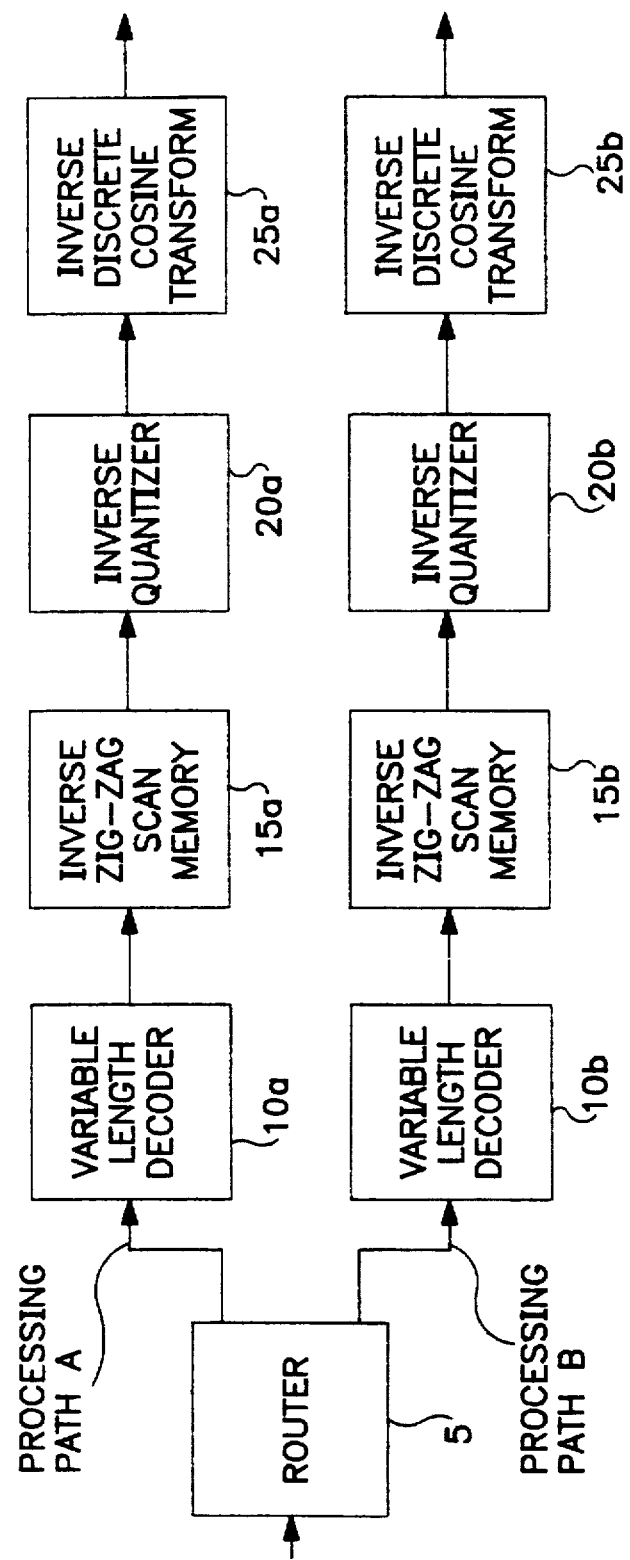
FIG. 13 is a block diagram of a prior art IDCT apparatus.

In the exemplary embodiment of the invention, the IDCT circuits process eight DCT coefficient values in four clock periods in each of its sections. The IDCT circuit 30 of FIG. 1a operates at twice the data rate of IDCT circuit 25a or 25b of FIG. 13.

IDCT APPARATUS

Figure 1C:
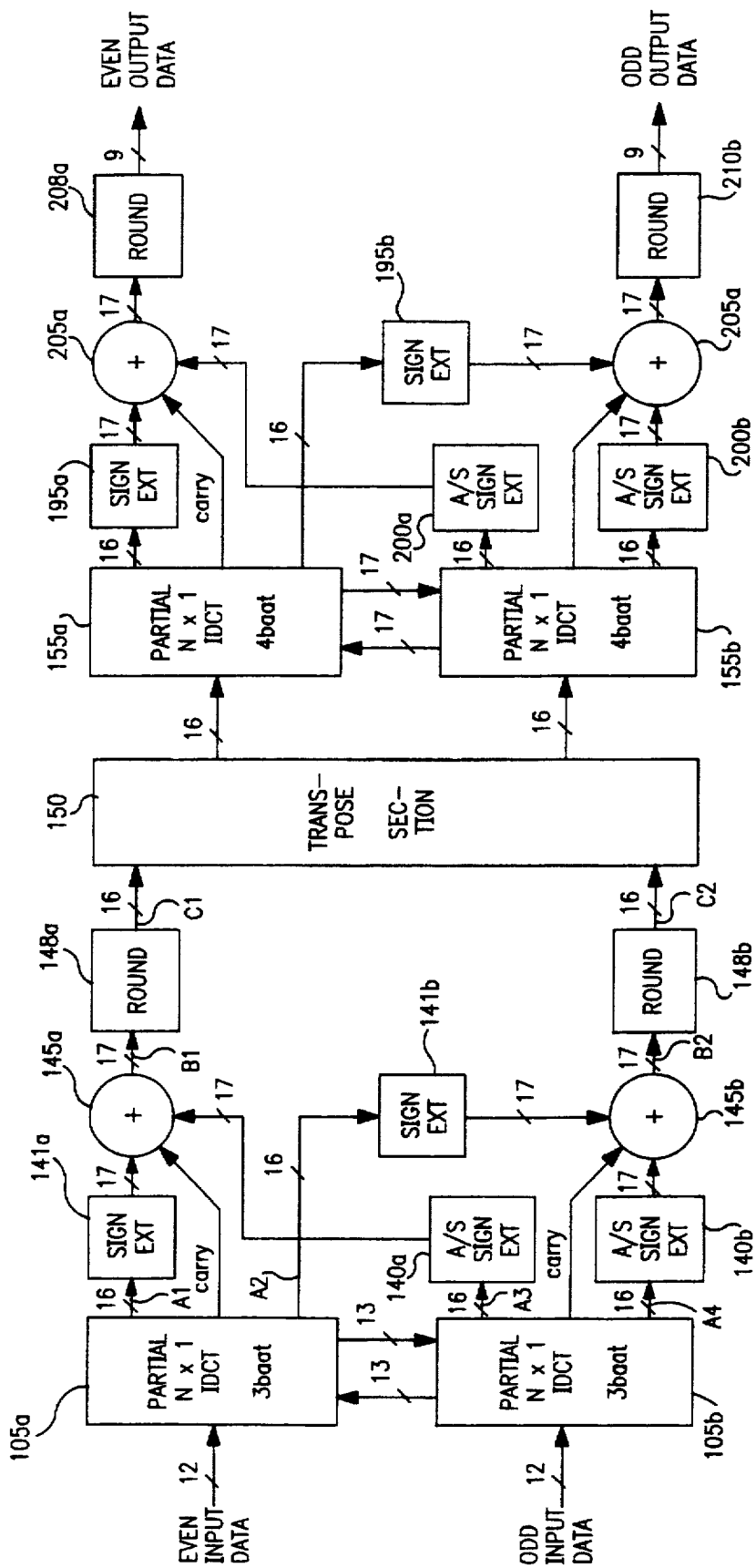
FIG. 1c is a more detailed block diagram a portion of the IDCT apparatus shown in FIG. 1b.

FIG. 1c is a more detailed block diagram of a portion of the IDCT circuitry shown in FIG. 1b. Read/write address and control circuit 330 and the timing and control circuitry 320 have been omitted from FIG. 1c.

2N×1 IDCT circuit 300 includes two partial N×1 IDCT circuits 105a and 105b which process DCT coefficients from respective even and odd processing paths. In four clocks, partial IDCT circuit 105a is provided four 12-bit even coefficient values X0, X2, X4, and X6 and partial IDCT circuit 105b is provided four 12-bit odd coefficient values X1, X3, X5, and X7. The even and odd coefficient values X0, X1, X2, X3, X4, X5, X6, and X7 are a group of eight DCT coefficient values which form a column of a block. A block has sixty four DCT coefficient values as shown in FIG. 2b. There are eight groups of even and odd coefficient values X0–X7 which correspond to the 64 DCT coefficient values. These eight groups are each separated into sets of the even and odd coefficients as shown in the even section timing diagram of FIG. 2f. FIGS. 2e and 2f illustrate the correlation between the even and odd coefficient values applied to the IDCT circuits 105a and 105b and the sixty four DCT coefficients values within in a block. Partial IDCT circuits 105a and 105b process, in parallel, the respective even and odd coefficient values from a block.

The IDCT transformation is performed using two one-dimensional transformations. As a result, the first one-dimensional IDCT of the DCT coefficient values X0, X1, X2, X3, X4, X5, X6, and X7 produces the intermediate coefficient values X0', X1', X2', X3', X4', X5', X6', and X7'. A second one-dimensional transformation of a transpose set of intermediate coefficient values which include the values X0', X1', X2', X3', X4', X5', X6', and X7' produces the pixel values x1, x2, x3, x4, x5, x6, and x7.

The parallel processing of the even and odd coefficient values is possible because equation (1) can be separated into 2 smaller equations shown as equations (3a) and (3b). Partial IDCT circuits 105a and 105b each produce a group of intermediate coefficient values corresponding to the two groups of DCT coefficient values. The first group is intermediate coefficient values X0'+X7', X1'+X6', X2'+X5', X3'+X4', and the second group is intermediate coefficient values X0'−X7', X1'−X6', X2'−X5', X3'−X4'.

Figure 2D:
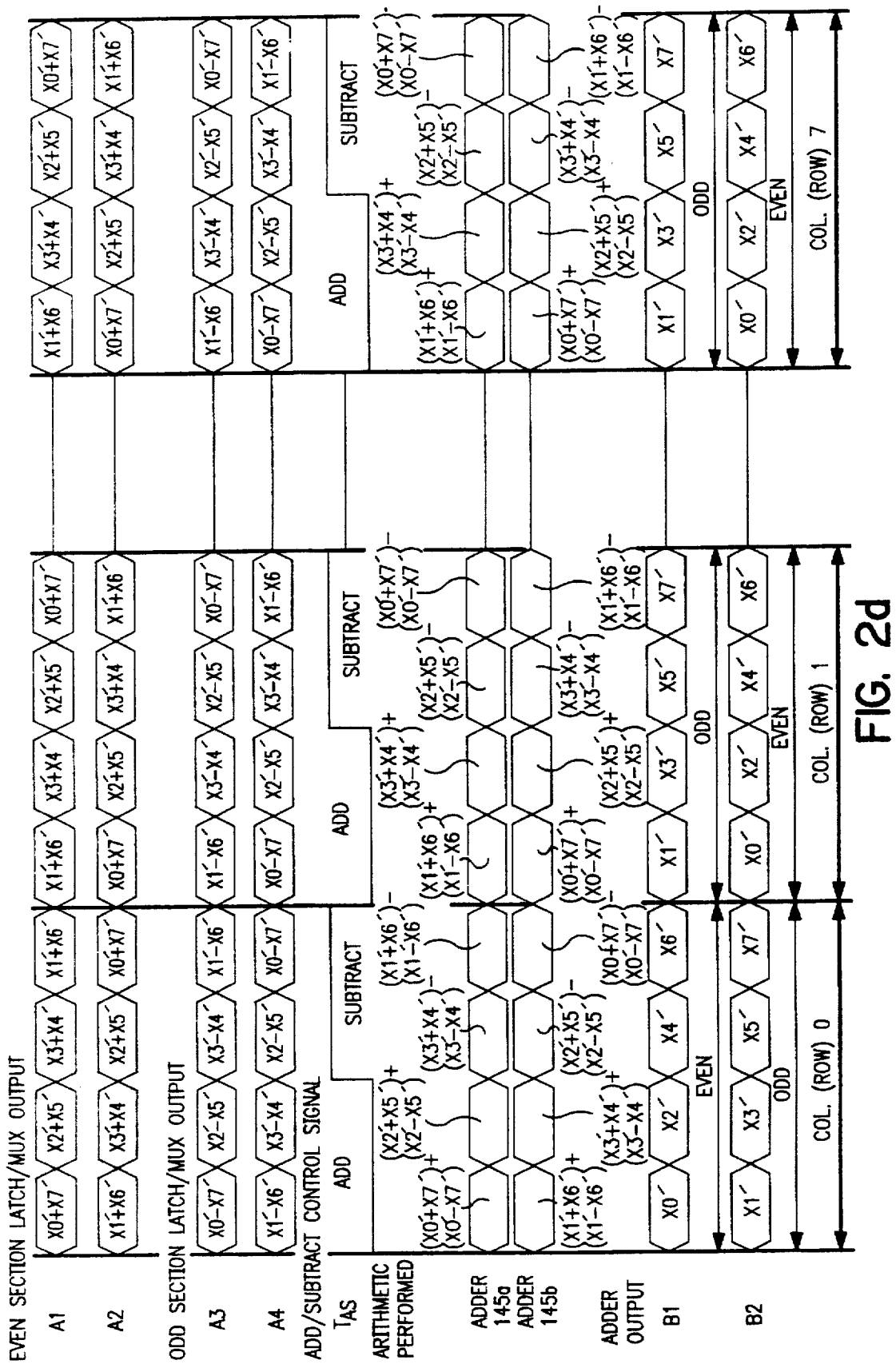
FIG. 2d is a timing diagram illustrating the operation of the partial IDCT circuit in FIGS. 1c and 1d.
Figure 2F:
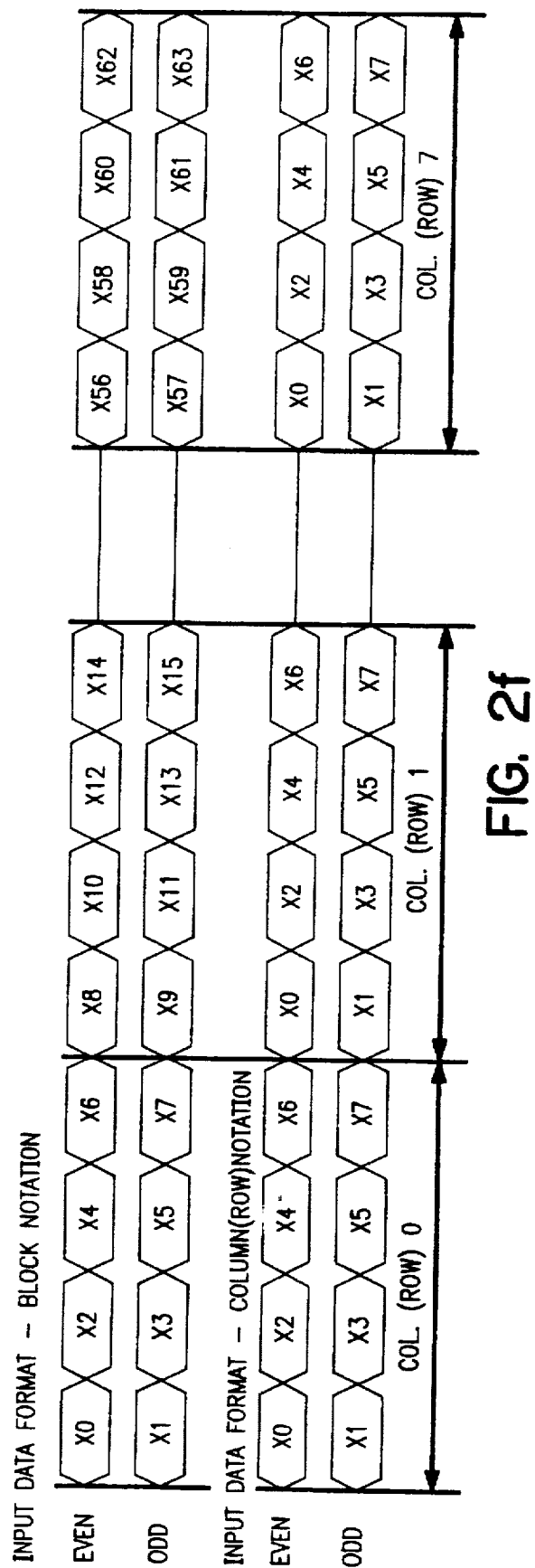
FIG. 2f is a timing diagram illustrating the data format for the even and odd processing paths of the IDCT apparatus shown in FIG. 1c in both block and column (row) notation.
Figure 2G:
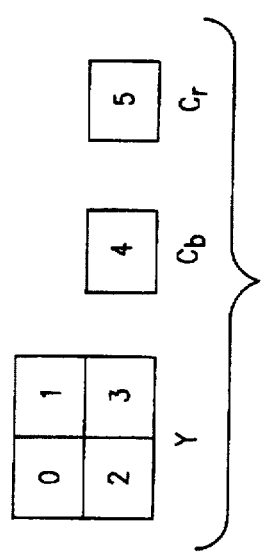
FIG. 2g is a data structure diagram illustrating the contents of a macroblock.

Add/Subtract sign extension circuits 140a and 140b, sign extension (SE) circuits 141a and 141b, and adders 145a and 145b, implement the crossover additions and subtractions shown in equation (2) to produce the intermediate DCT coefficient values X0', X1', X2', X3', X4', X5', X6', and X7' as shown in FIG. 2d.

Figure 1D:
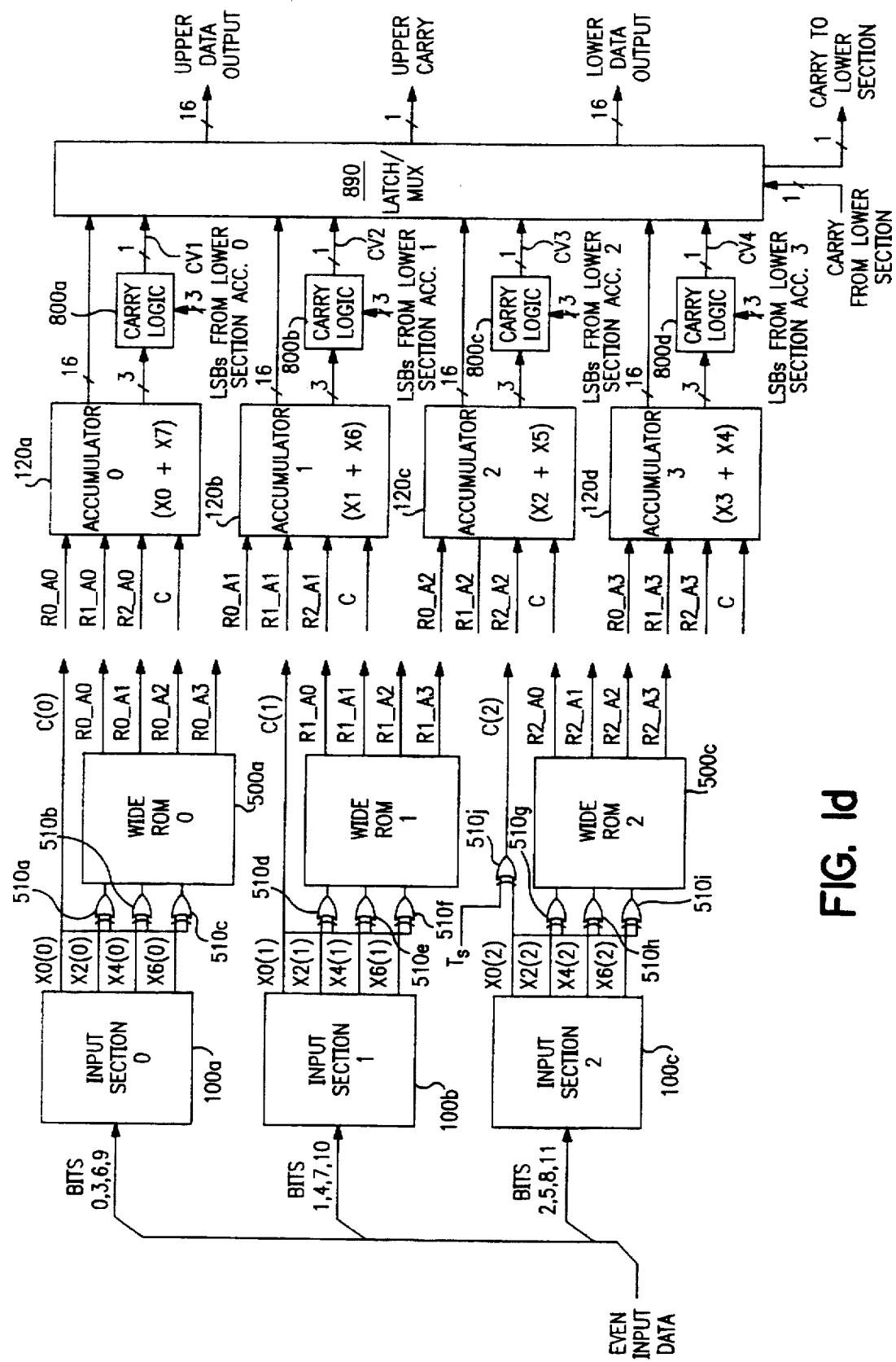
FIG. 1d is a block diagram of the partial IDCT circuit shown in FIG. 1c.

FIG. 1d is a more detailed block diagram of the partial IDCT circuit 105a. Partial IDCT circuit 105b is the same as partial IDCT circuit 105a except that partial IDCT circuit 105b is provided odd coefficient values X1, X3, X5, and X7.

Input sections 100a–100c, XOR gates 510a–510i, ROMs 500a–500c, and accumulators 120a–120d perform a distributed arithmetic operation in a three-bit-at-a-time (3baat) fashion. Each even and odd coefficient value has 12 bits Xn[11, 10, ..., 0,]. Each even coefficient value X0, X2, X4, and X6 is separated into three groups of four bits as the even coefficient values X0, X2, X4, and X6 are provided to input sections 100a–100c as shown in FIG. 1d and FIG. 2e. In addition, the odd coefficients X1, X3, X5, and X7 provided to the input sections in partial IDCT 105b are separated using the same method as shown in FIG. 2e.

Generally, the input sections 100a–100c rearrange N X-bit parallel data words into N digit-serial data words having Z bits. X, N and Z are integers. The individual bits of the X-bit parallel input word are distributed into Z groups containing X/Z bits such that adjacent bits are in different groups. An example distribution with Z=3 and X=12 would give the following:

Group 0: bits 0, 3, 6, 9
Group 1: bits 1, 4, 7, 10
Group 2: bits 2, 5, 3, 11

FIG. 1d shows this bit grouping and the bit connections to input sections 0, 1, and 2 directly relating to the groups 0, 1, and 2 above.

N input words are required to complete the inner product in both the even and odd partial 1-D IDCT sections. The grouping concept is the same for all N words. During a first set of N clock periods, N X-bit parallel words are stored into Z input sections. During the next N clock periods, Z bits from each of the N inputs are read in each clock period. The total number of bits read each clock period is Z*N. Using the same numbers as before and letting N=4, Z*N=3×4=12. Concurrently, with this reading operation, the next N input words are stored.

The following discussion is of a single input section which includes storage elements arranged as an array having N rows and N columns, where N is an integer. Each storage element stores a one bit digital value. A first one of the N Z-bit data words is stored in a first row or a first column of the array. A next one of the N Z-bit data words is stored in the first column or the first row of the array. The first one of the N Z-bit data words is concurrently shifted to a respective next subsequent row or a next subsequent column of the array. The first bits of the N serial words are retrieved from a column or a row of the array and the next bits of the N serial words are retrieved from the next successive column or row of the array.

Particularly, the input sections 100a–100c, as shown in FIG. 1d, rearrange the 4-bit parallel even coefficient values provided to (each input section to 4 bit-serial coefficient values each containing 4 bits where each bit of the four-bit output value represents the value at a bit position of a respective one of the four even coefficient values. The format of the even coefficient values is rearranged so that the even coefficient values can be applied to read only memories (ROMs) 500a–500c as an address to a memory location on a bit-serial basis. Stored at the memory locations are pre-computed values for the bit-products used to perform the first 1-D IDCT transformation. The even coefficient values X0, X2, X4, and X6 are rearranged by (1) applying one even coefficient value at a time to one of two sides of an array and (2) reading from one of the other two sides of the array the rearranged even coefficient value. For example, the even coefficient value X0, X2, X4, and X6 are alternately provided to the left side of the array and the bottom of the array and rearranged even coefficient values are alternately read from the right side of the array and the top of the array. In other words, the coefficient values provided to the left side of the array are subsequently read from the top of the array and the coefficient values provided to the bottom of the array are subsequently read from the right side of the array. When coefficient values are provided to the left side of the array, coefficient values which have been previously provided to the bottom of the array are read from the right side of the array. When coefficient values are provided to the bottom of the array, coefficient values which have been previously provided to the left side of the array are read from the top of the array.

The operation of input section 100a is described with reference to FIGS. 2e, 3a, 3b, and 4a–4i. The other input sections 100b and 100c operate the same as input section 100a except that different bits are provided to those input sections, as shown in FIG. 2e.

In summary, selected bits of the even coefficient values X0, X2, X4, X6 are alternately provided to the left side and bottom of the array MX to produce rearranged even coefficient values X0(k), X2(k), X4(k), and X6(k). The left side and the bottom are alternated every four clocks. The even coefficient values provided to the left side are right shifted through the array for four clocks and then shifted up and out of the top of the array in four clocks. The even coefficient values provided to the bottom are shifted up through the array for four clocks and then shifted right and out of the right side of the array MX in four clocks. The bits of the even coefficient values are alternately retrieved from the top or the right side of array MX for four clocks as new data is being stored into the bottom or left side of the array MX.

Figure 3A:
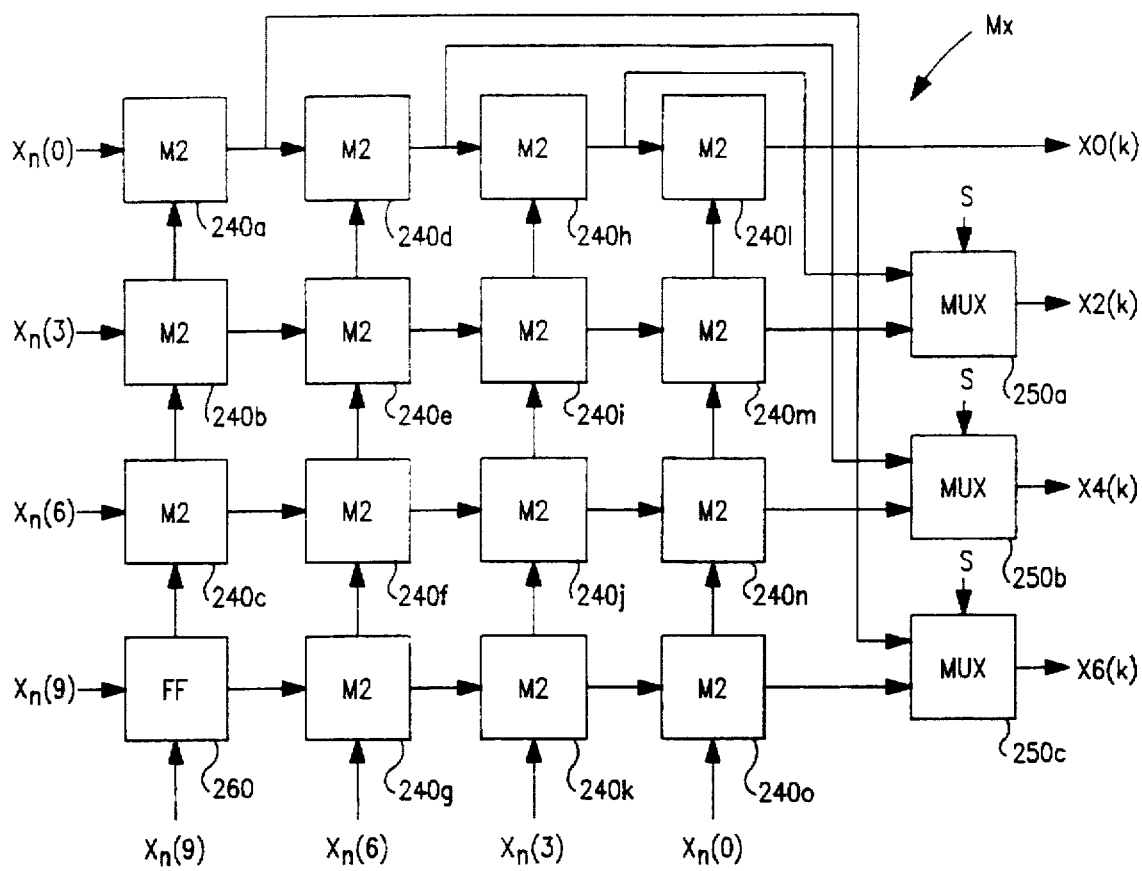
FIG. 3a is a block diagram of an exemplary input section suitable for use in the IDCT apparatus shown in FIG. 1d.
Figures 4A, 4B, 4C, 4D, 4E, 4F, 4G, 4H, 4I:
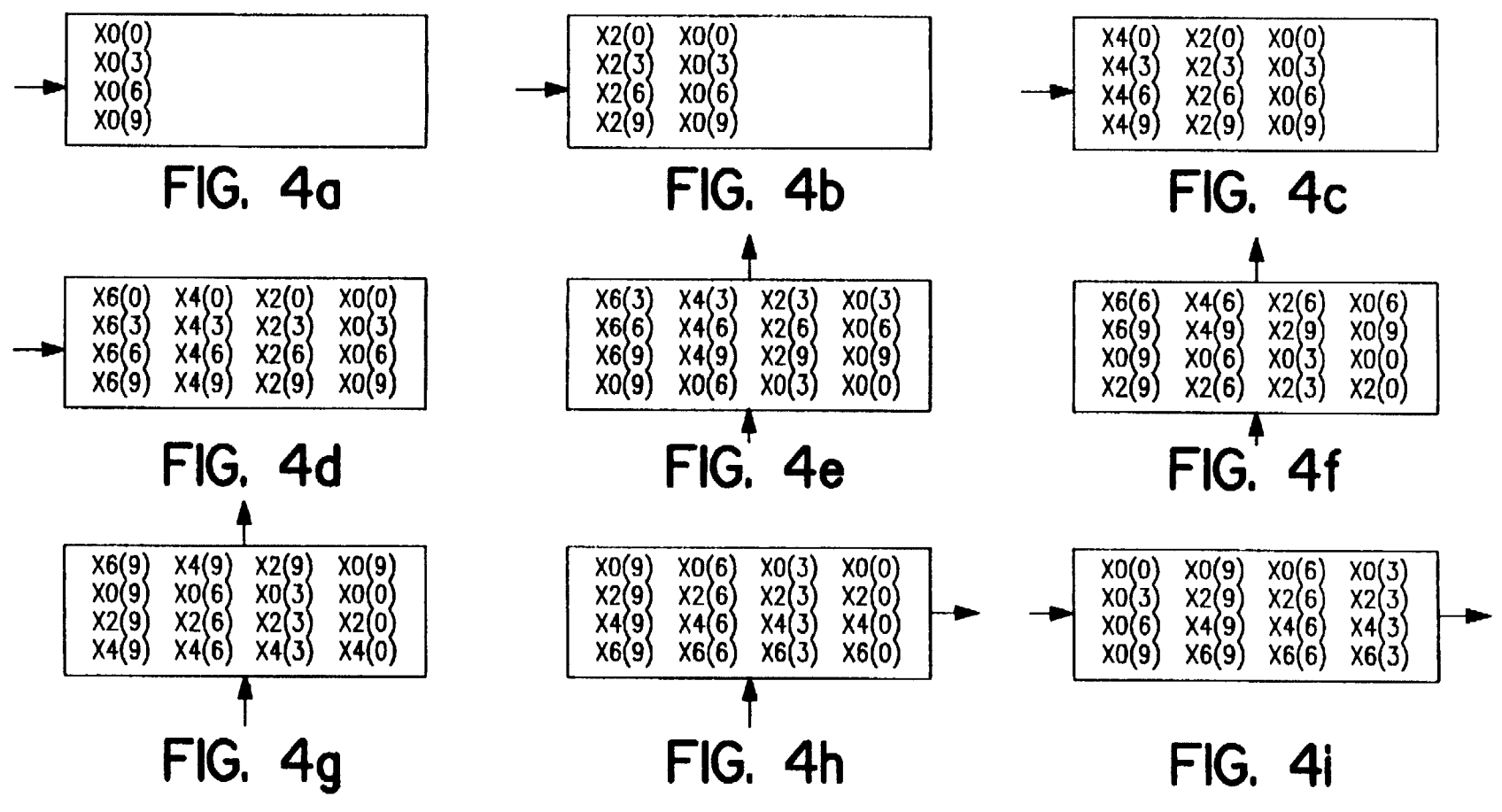

As shown in FIGS. 3a and 4a, bits [0, 3, 6, and 9] of even coefficient values X0 (i.e. X0(0), X0(3), X0(6) and X0(9)) are provided and stored respectively in M2 blocks 240a, 240b and 240c and flip-flop 260. In FIGS. 4a–4i, the first column corresponds to M2 blocks 240a–240c and flip-flop 260, the second column corresponds to M2 blocks 240d–240g, the third column corresponds to M2 blocks 240h–240k, and the fourth column corresponds to M2 blocks 240*l*–240*o*. Xn(k) is the even coefficient values where n identifies the even coefficient values and n=0, 2, 4, or 6 and k specifies a particular bit of the even coefficient values.

When the next even coefficient value X2 is provided to M2 blocks 240*a*, 240*b* and 240*c* and flip-flop 260, the bits [0, 3, 6, and 9] of input value X0 are provided to and stored in M2 blocks 240*d*, 240*e*, 240*f* and 240*g*, respectively, as illustrated in FIG. 4*b*. This process is repeated, as shown in FIGS. 4*c* and 4*d*, until the bits [0, 3, 6, and 9] of each even coefficient value X0, X2, X4, and X6 are stored in the M2 blocks 240*a*–240*o* and flip-flop 260 as shown in FIG. 4*d*. In FIGS. 4*a*–4*d*, each even coefficient value X0, X2, X4, and X6 is loaded into the first column including M2 blocks 240*a*–240*c* and flip-flop 260 and shifted right by a column until each of the even coefficient values X0, X2, X4, and X6 are loaded into input section 100*a*.

Next, as shown in FIGS. 4*d* and 4*e*, least significant bits (LSB), X0(0), X2(0), X4(0), and X6(0), are shifted out in bit-serial format. Multiplexers 250*a*, 250*b*, and 250*c* select the input values provided from M2 blocks 240*a*, 240*d*, 240*h*, and 240*l* in response to control signal S provided by timing and control circuit 330 shown in FIG. 1*a*. At substantially the same time, the input values stored in the matrix are shifted up one row as shown in FIG. 4*e*. Also at substantially the same time, four bits of the next even coefficient value X0 for the next column of the coefficient block are provided to input section 100*a* so that bits [9, 6, 3, 0] are respectively stored in flip-flop 260, and M2 blocks 240*g*, 240*k*, and 240*o*.

This process is repeated, as shown in FIGS. 4*e* to 4*g*, until the M2 blocks 210*a*–240*o* and flip-flop 260 have been provided four bits [0, 3, 6, and 9] from each even coefficient value X0, X2, X4, and X6. While the next even coefficient values are stored in the array MX, the previous even coefficient values are provided from the top of the array MX and selected by multiplexers 250*a*–250*c*.

Once the previous even coefficient values have been completely provided from the array, the next even coefficients are provided from the right side of the array, as shown in FIGS. 4*h* and 4*i*, and selected by multiplexers 250*a*–250*c* in response to control signal s. In addition, the next subsequent even coefficient values are provided to the right side of the array as shown in FIG. 4*i*.

Then, once the next subsequent even coefficient values have been provided to the matrix, the next subsequent even coefficient values are read from the top of the array. The reading and writing process is repeated as even coefficient values are provided to the input sections.

Figure 3B:
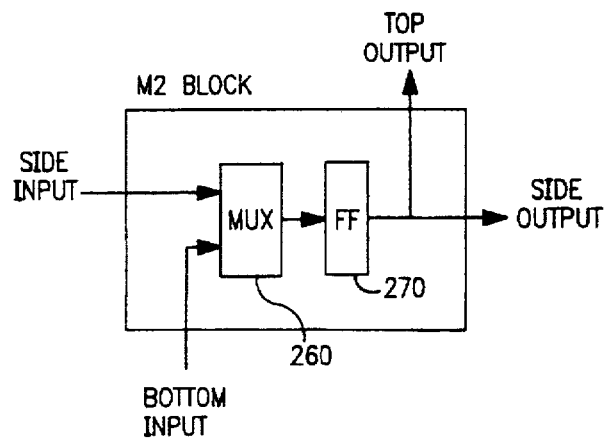

A more detailed block diagram of the M2 block of FIG. 3*a* is shown in FIG. 3*b*. Each M2 block, as shown in FIG. 3*b*, includes a multiplexer 260 which receives two input values and a flip-flop 270 which is provided the output of multiplexer 260. Multiplexer 260 is provided a control signal (not shown) by the timing and control circuit (shown in FIG. 1*a*) to control the selection of the two input values.

The other input sections operate in the same manner except that the other input sections are provided different bits from even coefficient values.

Using all three input sections, four coefficient values are stored into the input sections and four coefficient values are provided by the input section during four clock periods of the clock signal.

The coefficient bit values X0(k), X2(k), X4(k) and X6(k) selected by multiplexers 250*a*–250*c* (shown in FIG. 3*a*) from input sections 100*a*–100*c* are provided to read-only-memories (ROMs) 500*a*–500*c* through XOR gates 510*a*–510*i* (shown in FIG. 1*d*) as an address to a memory location within the ROMs. Even coefficient bits X0(k), X2(k), X4(k), and X6(k) identify a set of four pre-computed values stored in each of the ROMs 500*a*–500*c*.

ROMs 500*a*–500*c* store pre-computed values Rx-A0, Rx-A1, Rx-A2, and Rx-A3 where x=0, 1, and 2. Table 1a below illustrates the contents of ROM 500*a*. ROMS 500*b* and 500*c* have the same contents. The contents of the ROMs (not shown) in the partial IDCT circuit 105*b* are shown in Table 2. Table 1b shows the complete address space for ROM 500*a*. As shown in Table 1b, the lower half is a mirror image of the upper half of the memory with the sign reversed. By XORing even coefficient bit X0(k) with the other even coefficient bits X2(k), X4(k), and X6(k), the proper address is generated for the pre-computed value stored in ROM 500*a* where ROM 500*a* has memory contents as shown in Table 1a. When X0(k) is zero, the address generated by X2(k), X4(k), and X6(k) is unaffected by the XOR logic. When X0(k) is one, the address points to values in the bottom half of table 1b. The XOR logic modifies the address generated by X2(k), X4(k), and X6(k) causing the address to point to the mirror image in the upper half. The sign of the mirror image is corrected by negating the ROM output in the accumulator sections. The outputs C(0), C(1), and C(2) are used as carrys in the accumulator sections as a part of the algorithm to negate the ROM output. XOR gates 510*a*–510*i* between input sections 100*a*–100*c* and ROMs 500*a*–500*c* XOR the even coefficient bit-values.

TABLE 1a

| Memory Address | Rx-A0 | Rx-A1 | Rx-A2 | Rx-A3 |
|---|---|---|---|---|
| 000 | −0.68 | .135 | −.135 | −.027 |
| 001 | −.489 | −.327 | .327 | −.218 |
| 010 | −.327 | −.218 | −.489 | .327 |
| 011 | −.135 | −.68 | −.027 | .135 |
| 100 | −.218 | .327 | −.327 | −.489 |
| 101 | −.027 | −.135 | .135 | −.68 |
| 110 | .135 | −.027 | −.68 | −.135 |
| 111 | .327 | −.489 | −.218 | −.327 |

TABLE 1b

| Memory Address | Rx-A0 | Rx-A1 | Rx-A2 | Rx-A3 |
|---|---|---|---|---|
| 0000 | −.68 | .135 | −.135 | −.027 |
| 0001 | −.489 | −.327 | .327 | −.218 |
| 0010 | −.327 | −.218 | −.489 | .327 |
| 0011 | −.135 | −.68 | −.027 | .135 |
| 0100 | −.218 | .327 | −.327 | −.489 |
| 0101 | −.027 | −.135 | .135 | −.68 |
| 0110 | .135 | −.027 | −.68 | −.135 |
| 0111 | .327 | −.489 | −.218 | −.327 |
| 1000 | −.327 | .489 | .218 | .327 |
| 1001 | −.135 | .027 | .68 | .135 |
| 1010 | .027 | .135 | .135 | .68 |
| 1011 | .218 | −.327 | .327 | .489 |
| 1100 | .135 | .68 | .027 | −.135 |
| 1101 | .327 | .218 | .489 | −.327 |
| 1110 | .489 | .327 | −.327 | .218 |
| 1111 | .68 | −.135 | .135 | .027 |

TABLE 2

| Memory Address | Rx-A0 | Rx-A1 | Rx-A2 | Rx-A3 |
|---|---|---|---|---|
| 000 | -.641 | .225 | -.15 | .127 |
| 001 | .543 | -.053 | .265 | -.363 |
| 010 | -.363 | -.265 | -.053 | .543 |
| 011 | -.265 | -.543 | .363 | .053 |
| 100 | -.225 | .127 | -.641 | -.15 |
| 101 | -.127 | -.15 | -.225 | -.641 |
| 110 | .053 | -.363 | -.543 | .265 |
| 111 | .15 | -.641 | -.127 | -.225 |

The MSBS or sign bits of the even coefficient values $X_n(11)$ are stored in input section 100c. The timing signal Ts is active high during the clock cycle when the sign bits are read. Ts is XORed with X0(k) at XOR gate 510j, shown in FIG. 1d. This XOR function causes C(2) to be inverted with respect to X0(k) during sign time. A truth table is shown below:

| Ts | X0 (k) | C (2) | description |
|---|---|---|---|
| 0 | 0 | 0 | not sign time and no mirror = don't negate |
| 0 | 1 | 1 | not sign time and mirror = negate |
| 1 | 0 | 1 | sign time and no mirror = negate |
| 1 | 1 | 0 | sign time and mirror = don't negate |

When Ts is 0, C2 operates in a similar manner to C0 and C1. When Ts is 1, C2 causes negation if no mirror function is required. If both Ts and X0(k) are one, a double negation is being requested resulting in no negation.

Each ROM 500a–500c produces four 16 bit precomputed values specified by even coefficient values X0(k), X2(k), X4(k), and X6(k). For example, ROM 500a provides pre-computed values R0__Ax where x=0, 1, 2, and 3, ROM 500b provides pre-computed values R1__Ax, and ROM 500c provides pre-computed values R2__Ax. The pre-computed values are retrieved from the ROM according to the outputs produced by respective XOR gates 510a–510i. The pre-computed values are provided respectively to accumulators 120a–120d as shown in FIG. 1d. In addition, each accumulator 120a–120d is provided with carry in values c(n) where n=0, 1, and 2.

Figure 6:
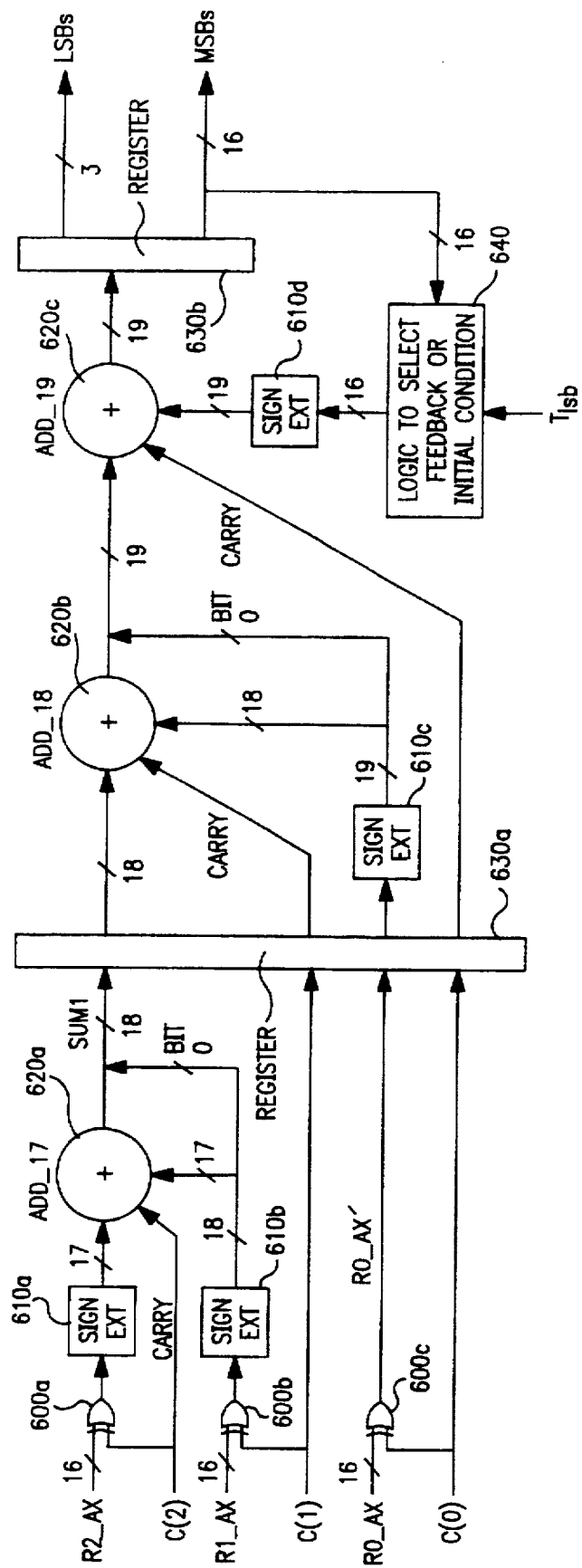
FIG. 6 is a block diagram of an exemplary accumulator 120 shown in FIG. 1d suitable for use in the 3baat IDCT circuits 105a and 105b shown in FIG. 1c.

An exemplary accumulator suitable for use as one of the 3baat accumulators 120a–120d is shown in FIG. 6. The accumulator receives three 16-bit pre-computed values R0__Ax, R1__Ax, and R2__Ax from respective ROMs 500a, 500b, and 500c. In addition, each accumulator is provided carry input values c(0), c(1), and c(2). The values c(0), c(1), and c(2) are used to negate the ROM output as needed for the address mirror function. Additionally, c(2) is used for sign time negation of the ROM output.

The accumulators in the partial IDCT 105a and 105b respectively produce values (X0'+X7'), (X1'+X6'), (X2'+X5'), (X3'+X4'), (X0'-X7'), (X1'-X6'), (X2'-X5'), and (X3'-X4'). These values are converted to intermediate coefficient values X0', X1', X2', X3', X4', X5', X6', and X7' prior to being transposed in transpose RAM 150 shown in FIG. 1b. To perform this conversion, the values produced by accumulators 120a–120d are selected by latch/mux circuit 890 and combined using the A/S circuitry 140a and 140b, S/E circuits 141a and 141b, adders 145a and 145b, and rounding circuits 148a and 148b to produce values X0', X1', X2', X3', X4', X5', X6', and X7' as shown in FIG. 2d completing the 1-D IDCT.

As shown in FIG. 6, the carry values c(2), c(1), and c(0) are XORed with respective pre-computed values R2__Ax, R1__Ax, and R0__Ax to produce the values R2__Ax', R1__Ax', and R0__Ax'. If the carry value is a one, the result is a one's complement of the pre-computed values. Subsequently the carry in values c(2), c(1), and c(0) are added to the accumulated values as pre-computed values R2__Ax, R1__Ax, and R0__Ax and summed. As a result, if any of the values c(2), c(1), and c(0) is one, the twos-complement of the respective value R2__Ax, R1__Ax, and R0__Ax is used in the sum. This implements the sign change for the pre-computed value which would be in the bottom half of the Table 2 and also the sign change that may be required at sign time.

Sign extension circuits 610a and 610b extend the sign bit of the output values provided by XOR gates 600a and 600b. The output signals of sign extension circuits 610a and 610b are added at adder 620a with c(2). Table 3 below illustrates the extended pre-computed values R2–Ax' and R1–Ax'.

The LSB of the extended pre-computed value R1__Ax' is not used to produce the sum at adder 620a, but it becomes the LSB of the output value of adder 620a and provided to register 630a to produce the value SUM1. The output of XOR gate 600c and carry-in bit values c(1) and c(0) are also provided to register 630a.

The value SUM1, carry-in bit value C(1), and the output of XOR gate 600c, after having its sign bit extended at sign extension circuit 610c, are added at adder 620b. The LSB of the output value of the sign extension circuit 610c is not used to produce the sum at adder 620b, but it becomes the LSB of the output value of adder 620b to produce the value SUM2. SUM2 is added at adder 620c to the carry-in value c(0) and to the output value of sign extension circuit 610d to produce the value SUM3. Sign extension circuit 610d extends the sign bit of the output value of select logic 640. Logic 640 provides an initial condition or feedback value FBV from adder 620c. The initial condition is needed because offset binary is used for the precomputed values. The FBV value is the 16 MSBs of SUM3. In response to a timing signal Tlsb, the select logic 640 selects the 16 MSBS from the output of adder 620c or initial condition value ICV. The output of select logic 640 is provided to sign extension circuit 610d.

The signal Tlsb is active to provide the initial condition value to adder 620c when the first partial sum of a group of pre-computed values is being calculated. As each partial product is calculated, it is summed in the adder 620c with the accumulated previously computed partial product values, passed from the register 630b through the select logic 640. The result is then stored into the register 630b. A complete product is accumulated in four clock cycles.

Figure 7:
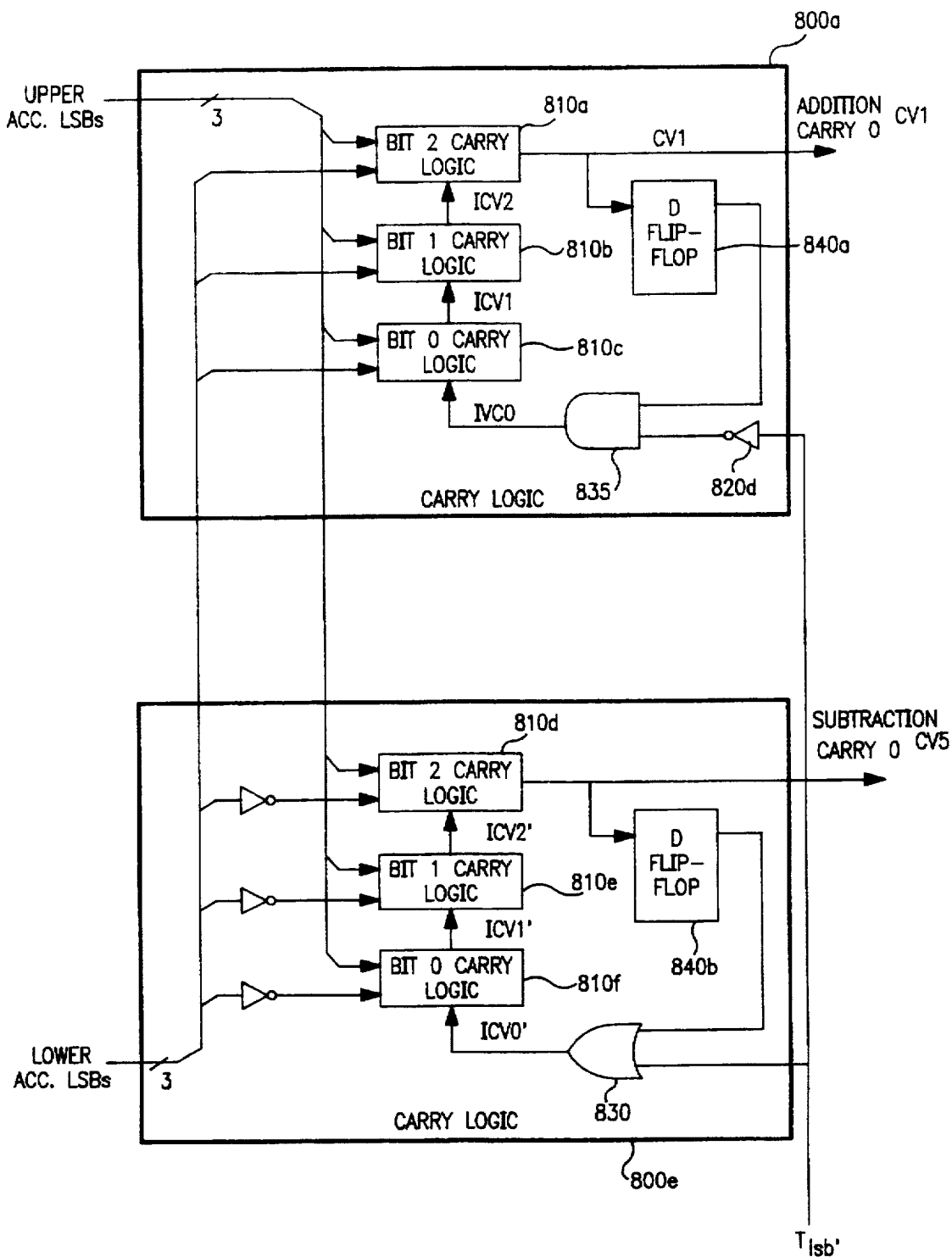
FIG. 7 is a block diagram of an exemplary carry logic circuitry suitable for use in the IDCT apparatus shown in FIG. 1d.

FIG. 7 is a block diagram of a portion of the carry logic circuitry. Referring to FIG. 1d, carry logic circuits 800a, 800b, 800c, and 800d are used in partial N×1 IDCT circuitry 105a. Almost identical carry logic circuits 800e, 800f, 800g, 800h (not shown) are used in partial N×1 IDCT processor 105b. The differences between carry logic circuits 800a, 800b, 800c, and 800d and carry logic circuits 800e, 800f, 800g, and 800h are illustrated in FIG. 7. The structure of carry logic circuits 800b, 800c, and 800d is the same as carry logic circuit 800a shown in FIG. 7. The structure of carry logic circuits 800f, 800g, and 800h is the same as carry logic circuit 800e shown in FIG. 7. For simplicity of explanation, only the carry logic circuits 800a and 800e are explained below. Carry logic 800e is located in partial IDCT circuit 105b shown in FIG. 1c. The carry logic 800a operates in combination with carry logic circuit 800e. Carry logic circuit 800b, 800c, and 800d operate in combination with respective carry logic circuits 800f, 800g, and 800h (not shown) in partial IDCT circuit 105b.

TABLE 3

| Binary Weight | R2-Ax' | R1-Ax' | Binary Weight | SUM1 | R0-Ax' | Binary Weight | SUM2 | SUM3 [16:3] | IC |
|---|---|---|---|---|---|---|---|---|---|
| 16 | 15 | 15 | 17 | 16 | 15 | 18 | 17 | 18 | 15 |
| 15 | 15 | 15 | 16 | 15 | 15 | 17 | 16 | 18 | 15 |
| 14 | 14 | 15 | 15 | 14 | 15 | 16 | 15 | 18 | 15 |
| 13 | 13 | 14 | 14 | 13 | 15 | 15 | 14 | 18 | 15 |
| 12 | 12 | 13 | 13 | 12 | 14 | 14 | 13 | 17 | 14 |
| 11 | 11 | 12 | 12 | 11 | 13 | 13 | 12 | 16 | 13 |
| 10 | 10 | 11 | 11 | 10 | 12 | 12 | 11 | 15 | 12 |
| 9 | 9 | 10 | 10 | 9 | 11 | 11 | 10 | 14 | 11 |
| 8 | 8 | 9 | 9 | 8 | 10 | 10 | 9 | 13 | 10 |
| 7 | 7 | 8 | 8 | 7 | 9 | 9 | 8 | 12 | 9 |
| 6 | 6 | 7 | 7 | 6 | 8 | 8 | 7 | 11 | 8 |
| 5 | 5 | 6 | 6 | 5 | 7 | 7 | 6 | 10 | 7 |
| 4 | 4 | 5 | 5 | 4 | 6 | 6 | 5 | 9 | 6 |
| 3 | 3 | 4 | 4 | 3 | 5 | 5 | 4 | 8 | 5 |
| 2 | 2 | 3 | 3 | 2 | 5 | 5 | 3 | 7 | 4 |
| 1 | 1 | 2 | 2 | 1 | 3 | 3 | 2 | 6 | 3 |
| 0 | 0 | 1 | 1 | 0 | 2 | 2 | 1 | 5 | 2 |
| | | 0 | 0 | 0 | 1 | 1 | 0 | 4 | 1 |
| | | | | | 0 | 0 | 0 | 3 | 0 |
| Carry In | C(2) | | | C(1) | | | C(0) | | |

Accumulators 120a–120d, as shown in FIG. 1d, provide the 16 MSBs and the 3 LSBs of a respective intermediate value to latch/mux circuit 890 and carry logic circuitry 800a–800d.

As shown in FIG. 7, the 3 LSBs of the value SUM3 (X0'+X7') from accumulator 120a are each provided to separate carry logic circuits 810a–810f, respectively. In addition, the 3 LSBs from accumulator 0 (not shown) of partial IDCT circuit 105b which provided the value X0'–X7' are provided to carry logic circuits 810d–810f through inverters 820a–820c and to carry logic circuits 810a–810c. The inverters are required to implement the subtraction operation.

Carry logic circuits 310a–810f combine their respective input values over four clock periods to produce a carry value which is added with values from accumulators 120a and 120e from partial IDCT circuits 105a and 105b at adders 145a and 145b. These circuits do not produce the sum of the bits, only the carry bit that would result if the values were summed. When the LSB is provided from accumulators 120a–120d, control signal $T_{LSB}'$ is used to provide the appropriate initial carry in to carry logic circuit 810c and 810f. The control signal $T_{LSB}'$ is active high providing a low value at the input to AND gate 835 through inverter 820d and an active high value to OR gate 830. Carry logic circuit 810c is provided with an initial carry value (ICV0) of zero since carry logic circuit 800a performs the addition of (X0'+X7')+(X0'–X7'). Carry logic circuit 810f is provided with an initial carry value ICV0' of one since carry logic circuit 800e performs the subtraction operation (X0'+X7')–(X0'–X7'). TLSB' is active for one clock cycle out of four required to complete the accumulated sum and also the carry value. After the initial carry value is provided during TLSB active time, the carry value CV1 stored in flip-flop 840a on the previous clock cycle is provided through AND gate 835 as carry value ICV0 for the next three clock cycles.

With reference to FIG. 7, carry logic circuitry 810c combines the least significant bit of the value X0'+X7' and the least significant bit of the value X0'–X7' with the carry value ICV0 to produce carry value ICV1. Carry logic circuitry 810b combines the first more significant bit of the value X0'+X7' and the first more significant bit of the value X0'–X7' with carry value ICV1 produced from carry logic circuit 810c to produce carry value ICV2. Intermediate carry value ICV2 is provided to carry logic circuit 810a, which combines carry value ICV2 with the second more significant bit of the value X0'–X7' to produce carry value CV1. Carry value CV1 is stored in flip-flop 840a on every clock cycle. Carry value CV1 is store[ ]d in latch 845a shown in FIG. 8 on every fourth clock cycle with the 16 MSBs of the value X0'+X7'.

Figure 8:
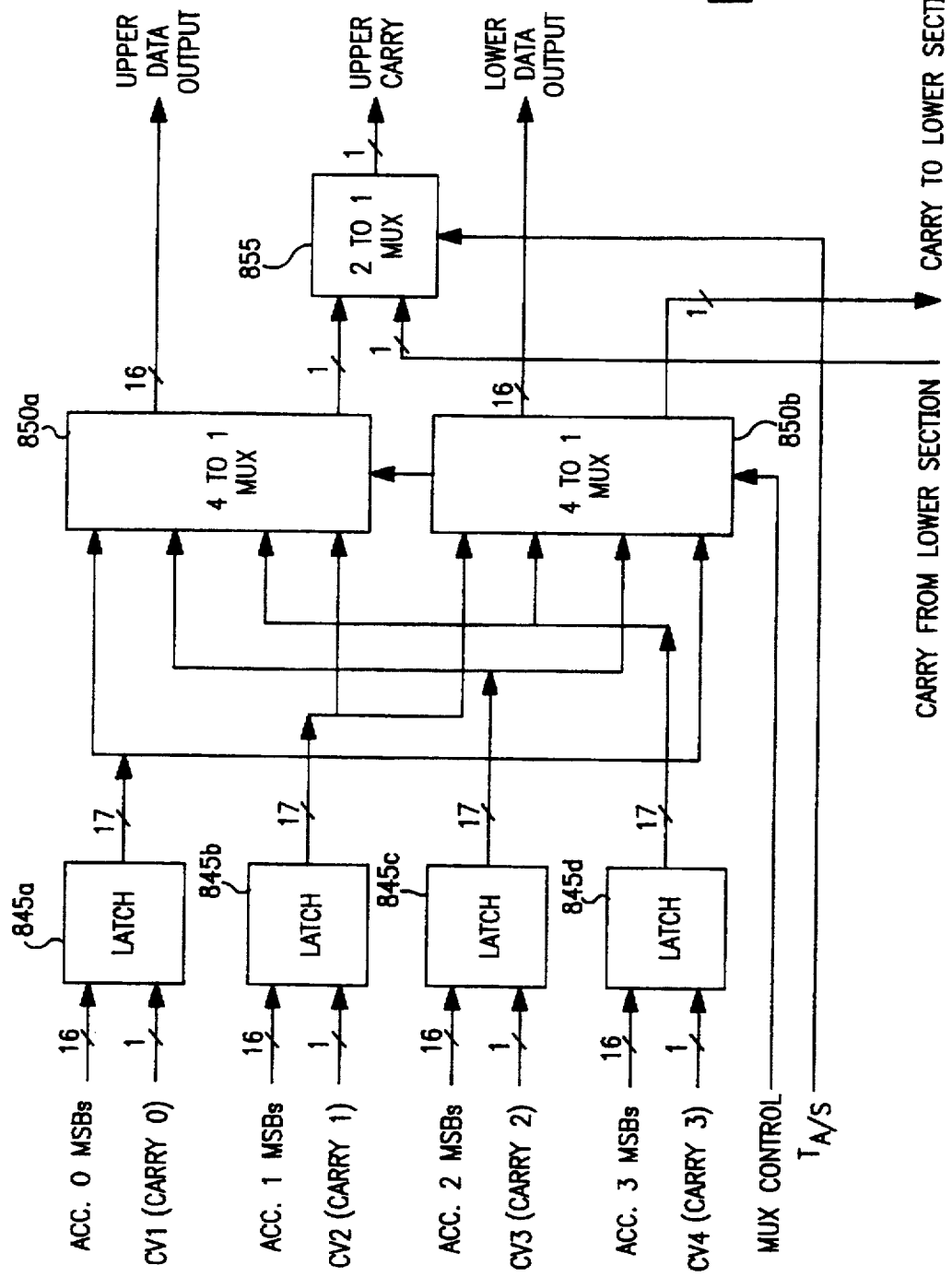
FIG. 8 is a block diagram of an exemplary latch/mux circuit suitable for use in the IDCT apparatus shown in FIG. 1d.

With reference to FIG. 8, carry value CV1 and the value X0'+X7' are stored in latch 845a for four clock cycles. The stored values in latch 845a are provided to multiplexer 850a. In addition, carry values CV2–CV4 from carry logic circuits 800b–800d are stored in respective latches 845b–845d. Multiplexers 850a and 850b select one of the four values stored in latches 845a–845d in response to a multiplexer signal from timing and control circuit 330 shown in FIG. 1b. Multiplexer 855 selects a carry value from multiplexer 850a or a corresponding multiplexer (not shown) in partial IDCT circuit 105b in response to the add/subtract signal $T_{A/S}$. Another multiplexer (not shown) selects a carry value from multiplexer 850b and a carry value from a multiplexer (not shown) in partial IDCT circuit 105b.

The carry logic circuitry 800a–800d produces four carry values CV1–CV4. Carry values CV1–CV4 are the addition carry values which are selected by the latch/mux circuitry to be used when adders 145a and 145b are performing an addition as shown in FIG. 2d. The carry logic circuitry 800e–800h (not shown) produce four carry values CV5–CV8 (not shown). Carry values CV5–CV8 are the subtraction carry values which are selected by the latch/mux circuitry to be used when adders 145a and 145b perform a subtraction operation as shown in FIG. 2d.

The process described above for producing carry value CV1 is substantially the same as the process to produce carry values from the other accumulators. One difference, however, is that the values provided from accumulators (not shown) in partial IDCT circuit 105b are first inverted and then provided to respective carry circuits as illustrated in FIG. 7.

The latch/mux circuit 890 selects the values from the accumulators and the carry logic to perform the arithmetic operations at adders 145a and 145b shown in FIG. 2d. The A/S sign extension circuits 140a and 140b shown in FIG. 1c are utilized to perform sign extension and negation if the subtraction operation is to be performed. The output values of the adders are shown in FIG. 2d.

Figure 9:
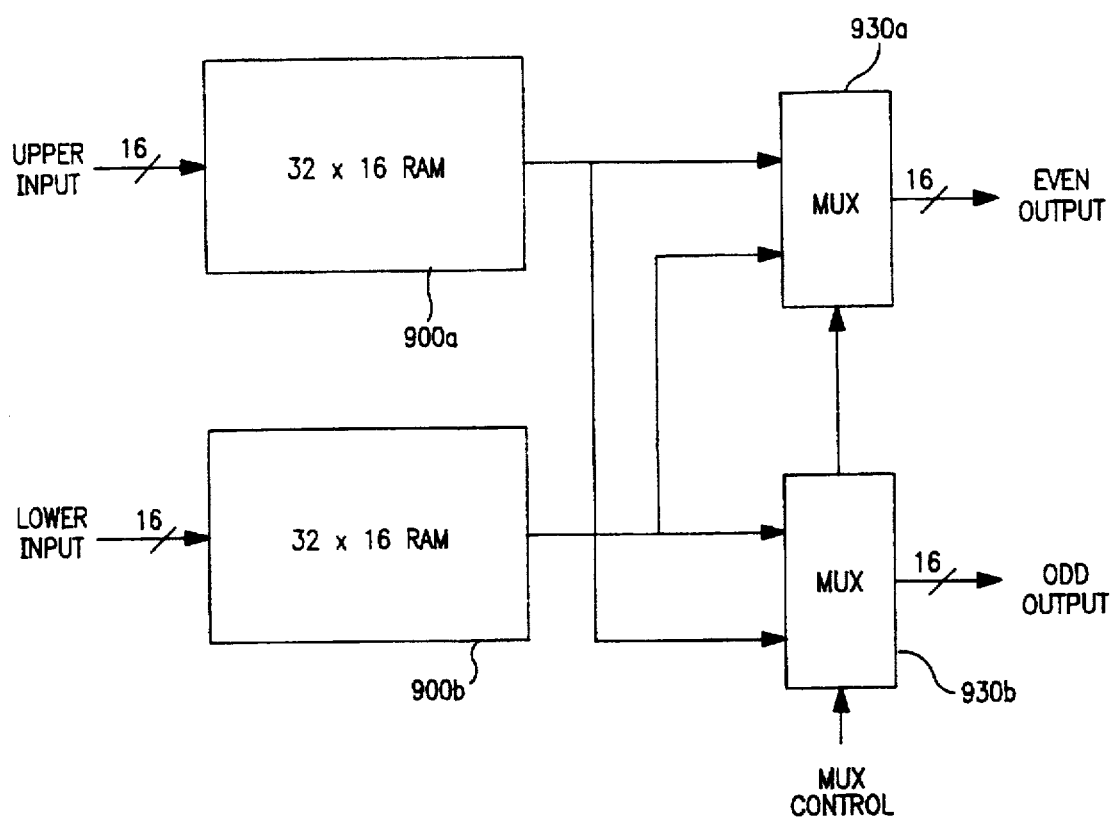
FIG. 9 is a block diagram of an exemplary transpose section 150 suitable for use in the IDCT apparatus shown in FIG. 1c.

FIG. 9 is a block diagram of the transpose RAM circuitry 150, shown in FIG. 1b. Values X0', X2', X4', and X6' and values X1', X3', X5', and X7' are alternatively provided to upper RAM 900a and lower RAM 900b, shown in FIG. 9.

The data provided from adders 145a and 145b are written into transpose RAM 150 as shown in FIGS. 9, 10, and 11a-11g. Transpose RAM 150 has two dual port RAMs 900a and 900b each having a 16 bit width and a 32-bit depth. The values produced by adder 145a and 145b are provided to RAMs 900a-900b. The values stored in RAMs 900a and 900b and selected by multiplexers 930a and 930b are transposed column to row. The transposed values are provided from RAMs 900a-900b.

As discussed above, the first 1-D IDCT is performed for the columns of a block of DCT coefficients and the second 1-D IDCT is performed for the rows of the intermediate coefficient values. As with the IDCT circuit 300, the processing in IDCT circuit 310 is separated into even and odd processing paths. Accordingly, during the transpose of the values in transpose RAM 150, the intermediate coefficient values are divided into even and odd groups (representing respective even and odd column numbers in each row of the coefficient block) to be provided to the even and odd input sections of the IDCT circuit 310, shown in FIG. 1b. The values provided to IDCT 310 are identified as Xn'. These values are not DCT coefficients but partially transformed values. The second IDCT circuit 310 performs the same steps as the IDCT circuit 300 to transform the values Xn' into image pixel values. This 1-D IDCT process is the same as that described above except that a 4baat process is used instead of a 3baat process.

It is noted that the same notation is used to describe the operation of the IDCT circuit 310 except that the values provided to IDCT circuit 310, as noted above, are not DCT coefficients but DCT coefficients which have been partially processed. Therefore when the notation X0, X1, X2, X3, X4, X5, X6, and X7 is discussed with reference to IDCT circuit 310, the values are intermediate coefficients and not DCT coefficients. IDCT circuit 310 completes the transformation to produce pixels x0, x1, x2, x3, x4, x5, x6, and x7.

The values provided to RAMs 900a and 900b are in a pattern for a group of 64 values which corresponds to a block. The 64 values include eight groups of eight values X0' to X7'. For purposes of illustration, the 64 values are identified as X0' to X63'. Values X0', X2', . . . , X60', and X62' are even values and values X1', X3', . . . , X61', X63' are odd values.

The reading and writing of values X0' to X63' to and from RAMs 900a and 900b is described below with reference to FIGS. 10 and 11. FIG. 10 is an illustration of the 32 different possible addresses A0–A31 for memory locations in RAMs 900a and 900b shown in FIG. 9.

As will become apparent below, once the writing and reading operations are initiated for the transpose RAM 150, data may be written into and simultaneously read from RAMs 900a and 900b without starting or stopping the transpose process. In addition, RAMs 900a and 900b alternately store even and odd values so that values can be provided from RAMs 900a and 900b and separated into even and odd input values for the second 1-D IDCT.

As shown in FIG. 11a, even values X0', X2', X4', and X6' are sequentially provided from the even section of the first 1-D IDCT 300 and sequentially stored in the first column of RAM 900a. Values X0', X2', X4', and X6' are respectively stored at memory addresses A0, A1, A2, and A3. At substantially the same time, odd values X1', X3', X5', and X7' are sequentially provided from the odd section of the first 1-D IDCT and sequentially stored in the first column of RAM 900b. Values X1', X3', X5', and X7' are respectively stored at memory addresses A0, A1, A2, and A3.

Then, odd values X9', X11', X13', and X15' are sequentially provided from the even section of the first 1-D IDCT and sequentially stored in the fifth column of RAM 900a. Values X9', X11', X13', and X15' are thus stored at respective memory addresses A16, A17, A18, and A19. At substantially the same time, intermediate coefficient values X8', X10', X12', and X14' are sequentially provided from the odd section of the first 1-D IDCT and sequentially stored in the fifth column of RAM 900b. Values X8', X10', X12', and X14' are respectively stored at memory addresses A16, A17, A18, and A19.

As illustrated in FIG. 11a, even and odd values are alternately provided to and stored in RAMs 900a and 900b and stored along the columns of the RAMs until all 64 values have been stored in the RAMs as shown in FIG. 11a.

Figures 11B, 11C, 11D:
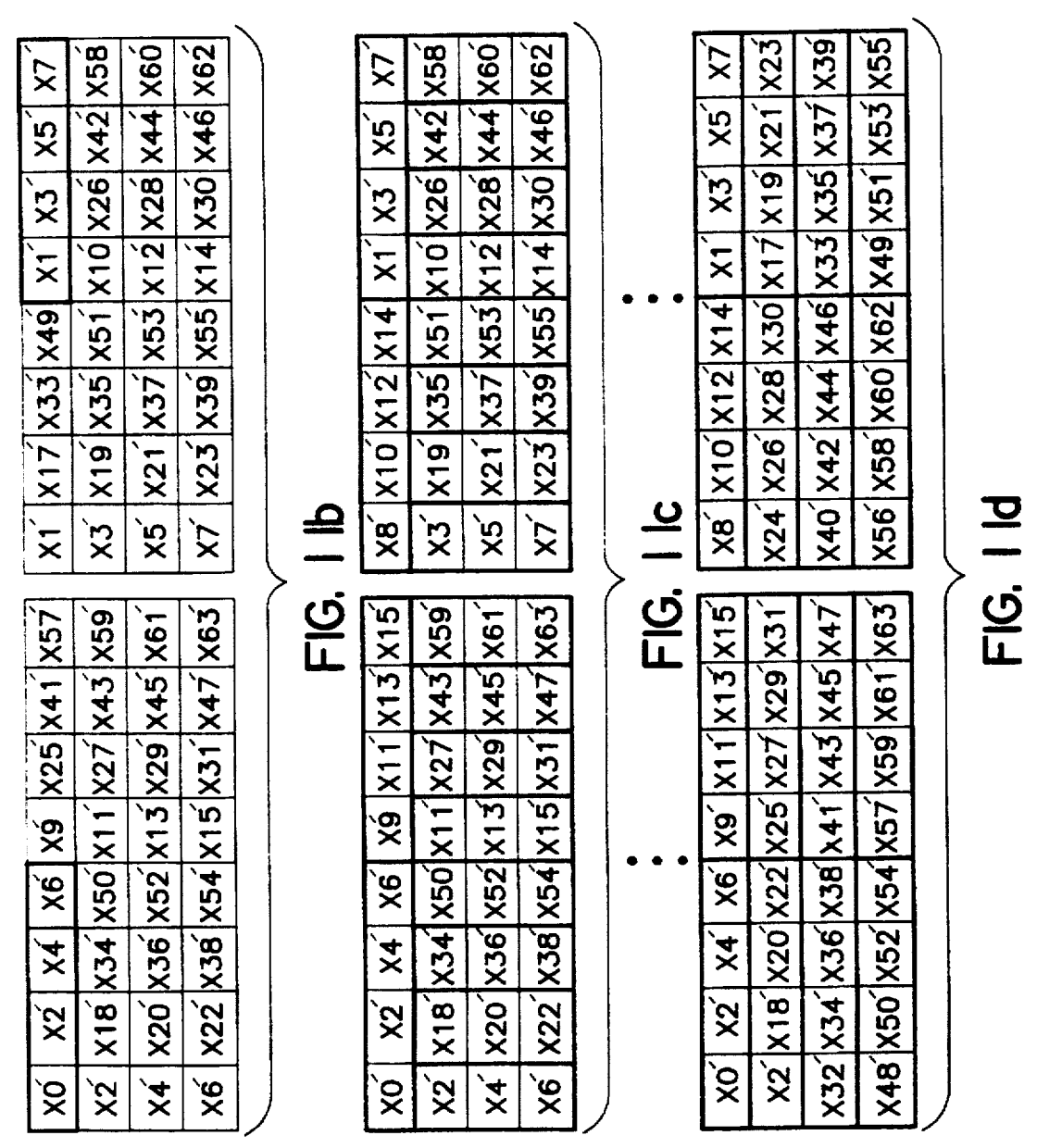

As shown in FIG. 11b, the values are retrieved from each of the RAMs 900a and 900b at a rate of one half row every four clock cycles. For example, as shown in FIG. 11b, values X0', X16', X32', and X48' are retrieved from RAM 900a via multiplexers 930a and 930b and used as even values X0, X2, X4, and X6 provided to partial IDCT circuit 155a. At substantially the same time, values X1', X17', X33', X49' are retrieved from RAM 900b via multiplexers 930a and 930b, and used as the odd values X1, X3, X5 and X7, for the IDCT circuit 155b. Then the next half row is sequentially retrieved from RAMs 900a and 900b as shown in FIG. 11c. The values are retrieved from the RAMs in the above half row method until all of the first group of 64 values have been retrieved as shown in FIG. 11d.

Referring to FIG. 11b, after the values have been read from a half row of RAMs 900a and 900b, values from the next group of 64 values are stored in the empty half row. For example, after values X1', X17', X33', X49' are retrieved from RAM 900a, values X0', X2', X4', and X6' from the next group of 64 values are stored in the half row that was just read. The same process is performed for RAM 900b except values X1', X3', X5', and X7' are stored in the half row that was just read.

Figures 11E, 11F, 11G:
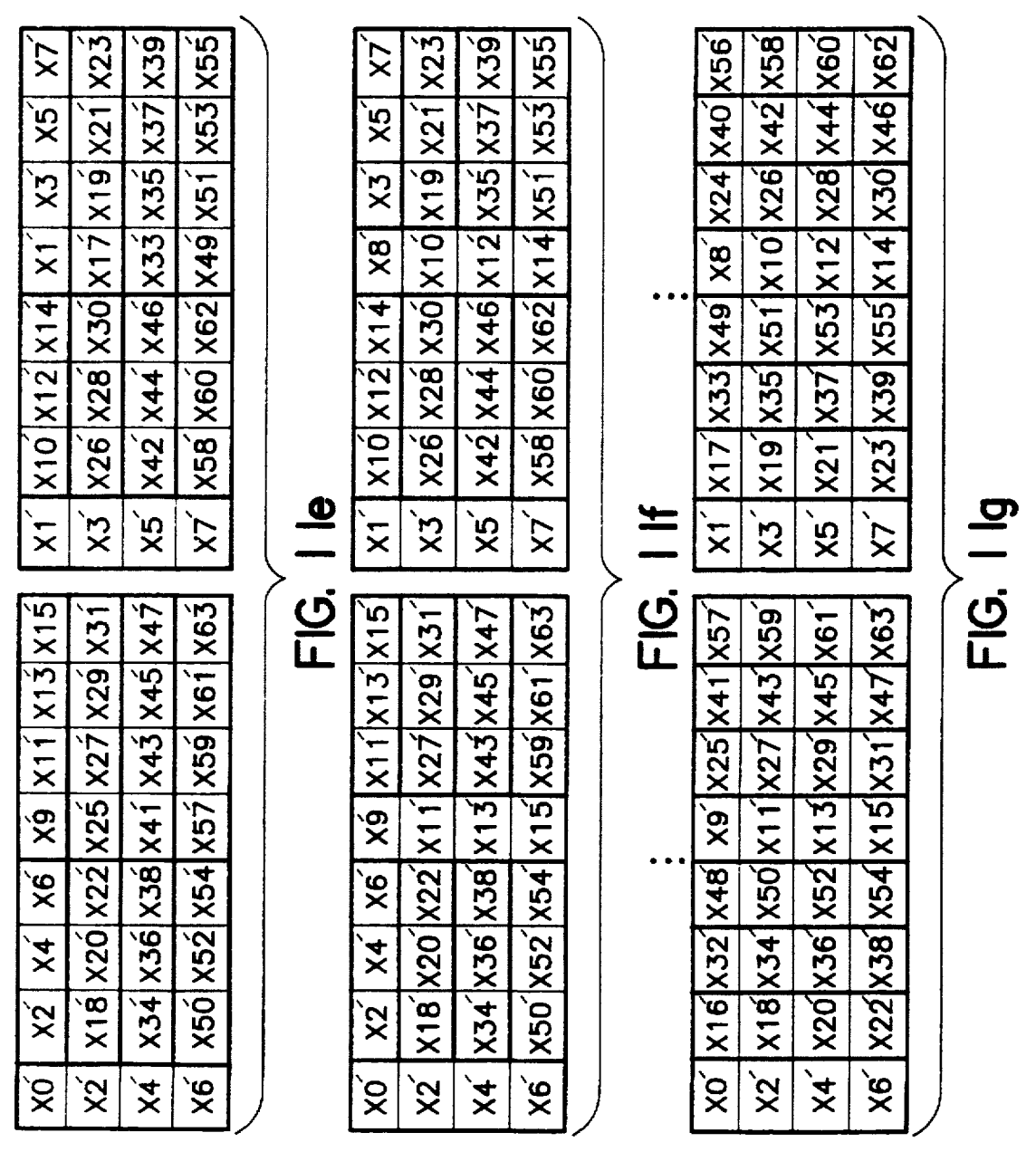

The values Xn' are written on the half rows of RAMs 900a and 900b until all of the 64 values from the next group of 64 values are stored in RAMs 900a and 900b as shown in FIG. 11b–11d. Then, values are retrieved from the columns of RAMs 900a and 900b as shown in FIGS. 11e–11g in the same format that the values are retrieved from the rows of RAMs 900a and 900b.

By storing to and retrieving from RAMs 900a and 900b in an alternating column and row sequence, values are continuously stored and retrieved from RAMs 900a and 900b.

Figure 5:
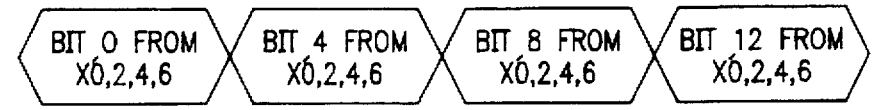
FIG. 5 is a timing diagram illustrating the data format for the even and odd processing paths of the IDCT apparatus 155a and 155b shown in FIG. 1c.
Figure 5:
Figure 5:
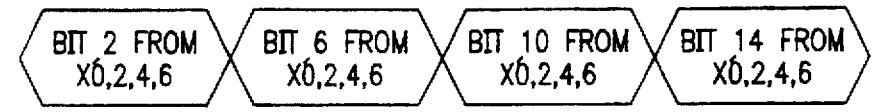
Figure 5:
Figure 5:
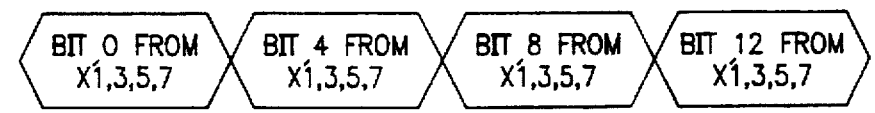
Figure 5:
Figure 5:
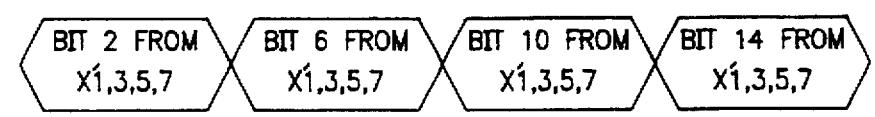
Figure 5:
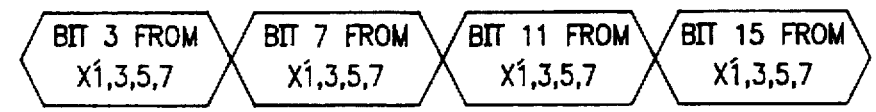

The values are selected by multiplexers 930a–930b to separate the values into even and odd values. The even values X0, X2, X4, and X6 are provided to the input sections (not shown) of partial IDCT circuit 155a and the odd values X1, X3, X5, and X7 are provided to the input sections (not shown) of partial IDCT circuit 155b. Partial IDCT circuits 155a and 155b are the same as partial IDCT circuits 105a and 105b except partial IDCT circuits 155a and 155b include an additional input section (not shown) to accommodate a wider bit width X equal to 16. A 16 bit value is provided from transpose RAM 150 to partial IDCT circuits 155a and 155b. In contrast, 12 bit values are provided to input sections 100a–100f. Because of this, the partial IDCT circuits 155a and 155b use 4baat arithmetic in order to process each half row of the eight coefficient values through each stage of the circuitry in four clock periods. The 16 bit values Xn' provided to the input sections for each of the partial IDCT circuits 155a and 155b are shown in FIG. 5.

Partial IDCT circuits 155a and 155b each have ROMs which are the same as ROMs 500a, 500b, and 500c except there is an additional ROM (not shown) corresponding to the additional input section (not shown). These ROMs are identical to the other ROMs in the respective 1-D IDCT circuits 105a and 105b. In addition, XOR gates (not shown) are coupled between the additional input section (not shown) and the additional ROM (not shown). The XOR gates perform the same function as XOR gates 510a–510i shown in FIG. 1d.

Furthermore, the accumulators in partial IDCT circuits 155a and 155b are the same as the accumulators in partial IDCT circuits 105a and 105b except that the accumulators in the circuits 155a and 155b each include an additional adder to accommodate the output provided from the additional ROM.

Figure 12:
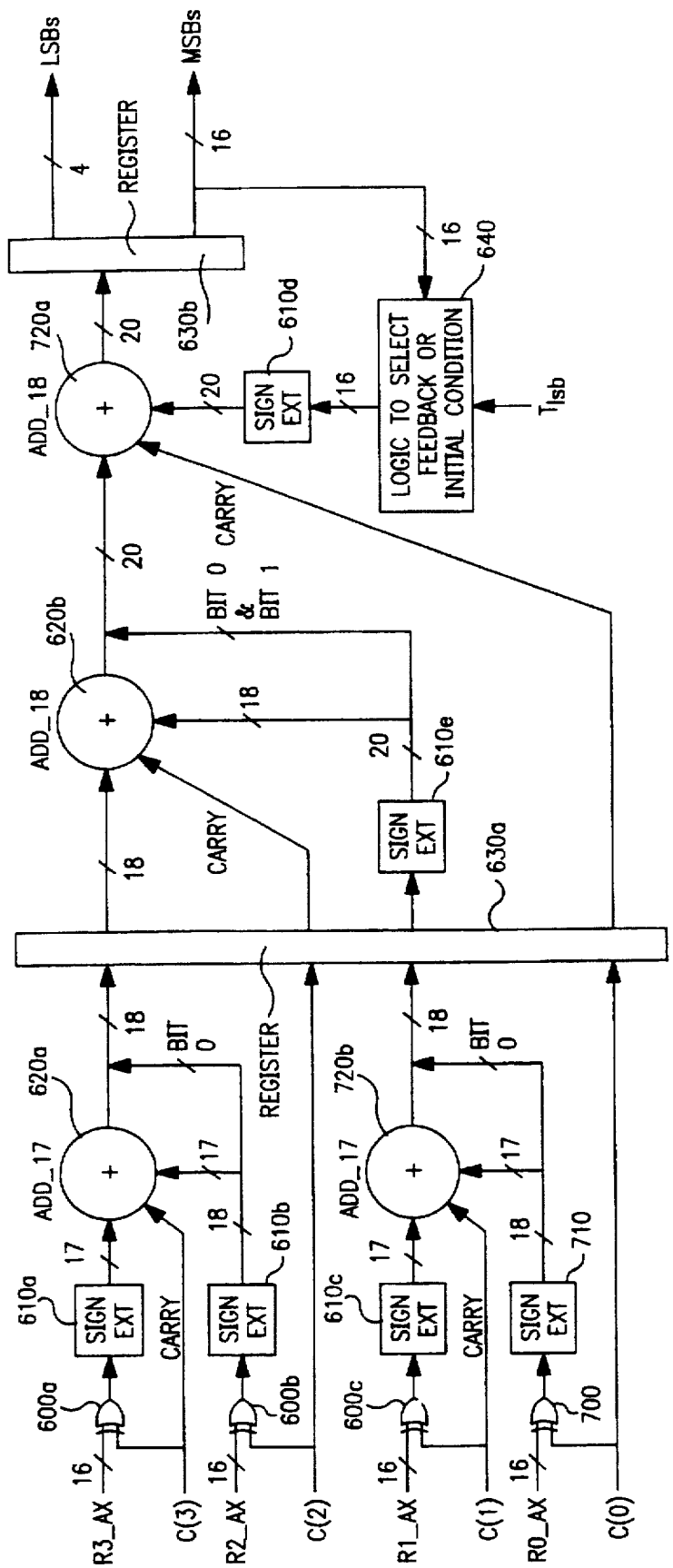
FIG. 12 is a block diagram of an exemplary accumulator suitable for use in the 4baat IDCT circuits 155a and 155b shown in FIG. 1c.

FIG. 12 is a block diagram of the accumulators in partial IDCT circuits 155a and 155b. The accumulator shown in FIG. 12 operates in the same way as the accumulator shown in FIG. 6 except that an additional sign extension circuit 710, XOR gate 700, and adder 720b are used to add the additional pre-computed value provided from the additional input section. Furthermore, adder 720a is a 20 bit adder to retain the significance resulting from the extra addition operation.

The output provided from the accumulator shown in FIG. 12 is 20-bits which is one more bit than the output provided from the accumulator shown in FIG. 6. The sixteen MSBs produced by respective accumulators shown in FIG. 12 are provided to the latch/mux circuitry (not shown) in IDCT circuit 155a and 155b. This is the same as the accumulator shown in FIG. 6 which is located in IDCT circuits 105a and 105b. The four LSBs produced by respective accumulators shown in FIG. 12 are provided to the carry logic circuitry (not shown) in IDCT circuit 155a and 155b.

The carry logic (not shown) in IDCT circuits 155a and 155b are the same as the carry logic 800a–800d and 800–800h, respectively, shown in FIGS. 1d and 7, in IDCT circuits 105a and 105b except an additional carry circuit (not shown) is added in each carry logic circuit (not shown) to calculate the carry value provided to the latch/mux circuitry (not shown) in IDCT circuits 155a and 155b. The additional carry circuitry is provided to calculate the carry value using the four LSBs provided from the accumulator shown in FIG. 12.

The latch/mux circuitry (not shown) is of the same design as the latch/mux circuitry 890 shown in FIGS. 1d and 8.

Sign extension circuits 195a and 195b, A/S sign extension circuits 200a and 200b, respectively operate the same way as sign extension circuits 141a and 141b, A/S sign extension circuits 140a and 140b. The timing diagram shown in FIG. 2d illustrates the operation of partial IDCT circuits 155a and 155b except that the output values X0', X1', X2', X3', X4', X5', X6', and X7' are pixels and not intermediate coefficients for IDCT circuits 155a and 155b.

The rounding circuits 210a and 210b round off the values that are provided to produce nine bit pixel values.

Although the above description was directed to IDCT processors, the present invention should not be limited to IDCT processors. The same methods can be utilized to perform a DCT. Although modifications would be required to produce such a circuit, given the description above, one skilled in the art would be able to construct a DCT processor employing the methods described above.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An apparatus for producing a carry value for an M-bit value which is a sum of at least two values, the at least two values having M more significant bits (MSBs) and N less significant bits (LSBs), where M and N are integers and N is greater than zero, the apparatus comprising:

means for receiving the N LSBs of the at least two values;

carry means for producing a carry value from the N LSBs of the at least two values without producing a sum value for the N LSBs, which carry value is the carry value which would be produced if the N LSBs of the at least two accumulated values were added; and means for adding or subtracting the M MSBs of the at least two accumulated values without adding or subtracting the N LSBs of the at least two accumulated values.

2. The apparatus according to claim 1, wherein the carry means comprises a first carry logic means and N–1 carry logic means where each one of the N–1 carry logic means is provided one-bit of the N LSBs from each of the at least two values and an intermediate carry value from a previous one of (1) the first carry logic means and (2) the N–1 carry logic means.

3. The apparatus according to claim 2, wherein the first carry logic means is provided a previous accumulated value from a last one of the N–1 carry logic means or an initial value.

4. The apparatus according to claim 2, wherein each one of the N–1 carry logic means is provided a respective previous intermediate carry value which has been produced by a respective preceding carry logic means as the intermediate carry value.

5. The apparatus according to claim 1, wherein the carry means only produces the carry value.

6. The apparatus according to claim 1, wherein the carry means comprises:

first carry logic means for producing an intermediate carry value by combining (1) a previously calculated carry value or an initial condition value as an input carry value, and (2) the least significant bit from each of the at least two values; and second carry logic means for producing the carry value by combining (1) the intermediate carry value and (2) a first more significant bit from each of the at least two values.

7. The apparatus according to claim 1 wherein the carry means includes:

means for producing a subtraction carry value from the N LSBs of the at least two values; and means for producing an addition carry value from the N LSBs of the at least two values.

8. An apparatus for producing an M-bit value which is an addition or subtraction of at least two accumulated values, where M is an integer, the apparatus comprising:

accumulator means for accumulating a plurality of input values to produce the at least two accumulated values, the at least two accumulated values having M more significant bits (MSBs) and N less significant bits (LSBs), where N is an integer and N is greater than zero; and carry means for producing a carry value from the N LSBs of the at least two accumulated values without producing a sum of the N LSBs of the at least two accumulated values, which carry value is the carry value which would be produced if the N LSBs of the at least two accumulated values were added or subtracted; and means for adding or subtracting the M MSBs of the at least two accumulated values without adding or subtracting the N LSBs of the at least two accumulated values and for adding the carry value to the result of the addition or subtraction to produce the M-bit value.

9. The apparatus according to claim 8, wherein the carry means comprises a first carry logic means and N−1 carry logic means where each one of the N−1 carry logic means is provided with one-bit of the N LSBs from each of the at least two accumulated values and an intermediate carry value.

10. The apparatus according to claim 9, wherein the first carry logic means is provided with a previous carry value from a last one of the N−1 carry logic means or an initial value.

11. The apparatus according to claim 9, wherein each one of the N−1 carry logic means are provided with a respective previous intermediate carry value which has been produced by a respective preceding carry logic means as the intermediate carry value.

12. The apparatus according to claim 8, wherein the carry means only produces the carry value.

13. The apparatus according to claim 8, wherein the carry means comprises:

first carry logic means for producing an intermediate carry value by combining (1) a previously calculated carry value or an initial condition value as an input carry value, and (2) the least significant bit from each of the at least two accumulated values; and second carry logic means for producing the carry value by combining (1) the intermediate carry value and (2) a first more significant bit from each of the at least two accumulated values.

14. The apparatus according to claim 8 wherein the carry means includes:

means for producing a subtraction carry value from the N LSBs of the at least two values; and means for producing an addition carry value from the N LSBs of the at least two values.

15. An apparatus for producing a first M-bit value which is an addition of at least two accumulated values where M is an integer, and for producing a second M-bit value which is a subtraction of the at least two accumulated values, the apparatus comprising:

accumulator means for accumulating a plurality of input values to produce the at least two accumulated values, the at least two accumulated values having M more significant bits (MSBs) and N less significant bits (LSBs), where M and N are integers and N is greater than zero;

addition carry means for producing an addition carry value from the N LSBs of the at least two accumulated values without producing a sum of the N LSBs of the at least two accumulated values, where the addition carry value is a carry value which would be produced if the N LSBs of the at least two accumulated values were added;

subtraction carry means for producing a subtraction carry value from the N LSBs of the at least two accumulated values without producing a subtraction of the N LSBs of the at least two accumulated values, where the subtraction carry value is a carry value which would be produced if the N LSBs of the at least two accumulated values were subtracted;

first means for combining the M MSBs of the at least two accumulated values and the addition carry value to produce the first M-bit value; and second means for combining the M MSBs of the at least two accumulated values and the subtraction carry value to produce the second M-bit value.

* * * * *